United States Patent
Mitomi et al.

(10) Patent No.: US 7,389,030 B2
(45) Date of Patent: Jun. 17, 2008

(54) OPTICALLY FUNCTIONAL DEVICE

(75) Inventors: Osamu Mitomi, Nagoya (JP); Jungo Kondo, Nishikamo-Gun (JP); Atsuo Kondo, Okazaki (JP); Kenji Aoki, Ichinomiya (JP); Tetsuya Ejiri, Kasugai (JP); Yuichi Iwata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/671,112

(22) Filed: Feb. 5, 2007

(65) Prior Publication Data

US 2007/0127862 A1 Jun. 7, 2007

Related U.S. Application Data

(63) Continuation of application No. PCT/JP2005/018386, filed on Sep. 28, 2005.

(30) Foreign Application Priority Data

Sep. 29, 2004 (JP) ............................ 2004-283197

(51) Int. Cl.
G02B 6/10 (2006.01)
(52) U.S. Cl. ...................................... 385/129; 385/131
(58) Field of Classification Search .................... None
See application file for complete search history.

(56) References Cited

U.S. PATENT DOCUMENTS 5,373,579 A 12/1994 Eda
5,866,200 A 2/1999 Yoshino et al. ............... 782/19
6,556,727 B2 4/2003 Minakata et al. .......... 782/155
2003/0138180 A1 7/2003 Kondo et al.
2004/0264832 A1 12/2004 Kondo et al.

FOREIGN PATENT DOCUMENTS

| JP | 05-264840 A1 | 10/1993 |
| JP | 06-289347 A1 | 10/1994 |
| JP | 09-269430 A1 | 10/1997 |
| JP | 2002-169133 A1 | 6/2002 |
| JP | 2003-215519 A1 | 7/2003 |
| JP | 2004-341147 A1 | 12/2004 |

*Primary Examiner*—Sung H Pak
(74) *Attorney, Agent, or Firm*—Burr & Brown

(57) ABSTRACT

An optical functional device comprises a dielectric substrate 5, a ferroelectric thin layer 10 provided on the dielectric substrate 5 and comprising a material having electro-optical effect and an electrode 3A, 3B provided on the ferroelectric thin layer 10. A part of the ferroelectric thin layer 10 functions as a core 9 of the optical wave guide and the dielectric substrate functions as a clad for the optical waveguide. The optical waveguide 9 constitutes a multi-mode waveguide in the direction "D" of depth of the ferroelectric thin layer.

18 Claims, 20 Drawing Sheets

(a)

(b)

(c)

OPTICALLY FUNCTIONAL DEVICE

FIELD OF THE INVENTION

The present invention relates to an optical functional device.

BACKGROUND OF THE INVENTION

So-called multi-media industry has been developed and broad band communication has been increasingly demanded, so that it has been already applied an optical communication system operating at a speed higher than 10 Gb/s. Such system operating at even higher speed is expected. An LN optical modulator is applied as a device for modulating electrical signal of 10 Gb/s or higher (microwave signal) to light.

It was invented a structure to satisfy velocity matching condition of microwave and light wave to realize wide-band modulation of an optical modulator, by lowering the thickness of an optical waveguide substrate (Japanese Patent publication No. 2002-169133A).

DISCLOSURE OF THE INVENTION

The applicant has disclosed that an adhesive layer having a substantially constant thickness is adhered onto the back face of a thin optical waveguide substrate having a thickness of 30 µm or smaller, in Japanese Patent Application No. 2002-330325.

The applicant have further disclosed that a supporting body and main body are adhered with an adhesive layer so that the minimum value of thermal expansion coefficient of the supporting body is made ⅕ or more of the minimum value of thermal expansion coefficient of the main body and the maximum value of thermal expansion coefficient of the supporting body is made 5 times or less of the thermal expansion coefficient of the main body, in Japanese Patent Application No. 2003-136740.

According to Japanese Patent applications 2002-330325 and 2003-136740, the thickness of a ferroelectric substrate forming an optical waveguide is made small to improve the intensity of electric field applied onto the substrate and to increase the effective electric field applied onto the optical waveguide. $V\pi \cdot L$ for driving the optical functional device can be thereby reduced.

It is effective for reducing the diameter of optical spot propagating in an optical waveguide, for further reducing $V\pi \cdot L$ for driving the optical functional device. The diameter of the optical spot propagating in the optical waveguide is, however, basically decided depending on the amount of an impurity such as titanium or proton normally diffused into the substrate and the processing temperature. If the confinement in the optical waveguide is made stronger to lower the diameter of the spot size, the propagation in the optical waveguide would be of multi-mode to result in problems of device properties. It has been thus considered to be difficult to further reduce the driving voltage $V\pi \cdot L$ by lowering the diameter of the optical spot.

An object of the present invention is to make it possible to lower the diameter of an optical spot propagating in an optical waveguide to reduce a driving voltage $V\pi \cdot L$ of an optical functional device.

The present invention provides an optical functional device comprising a dielectric substrate, a ferroelectric thin layer provided on said dielectric substrate and comprising a material having electro-optic effect and an electrode provided on said ferroelectric thin layer, wherein a part of said ferroelectric thin layer functions as a core of an optical waveguide and the dielectric substrate functions as a clad for the optical waveguide, and wherein the optical waveguide constitutes a multi-mode waveguide in the direction of depth of the ferroelectric thin layer and constitutes a single-mode or multi-mode waveguide in the horizontal direction.

The inventors have fundamentally studied the principles of various types of high-speed optical modulation devices and made the present invention.

For example, as shown in FIG. 1 (a), an optical waveguide 2 is formed in a surface region of a ferroelectric substrate 1 (X-cut) having a sufficiently large mechanical strength, and a signal voltage is applied on a signal electrode 3A and a ground electrode 3B to modulate light propagating in the optical waveguide. According to this type of optical modulating device, the substrate 1 is thick so that an electric field applied on the optical waveguide is lowered to a less extent. Further, in the case that an optical waveguide is formed in such thick substrate 1, the difference of the optical waveguide and the surrounding region is generally small and the optical spot tends to be widened, so that it is difficult to lower the optical spot size. For improving the confinement of light, it is necessary to enlarge the difference of refractive indices of the optical waveguide 2 and the surrounding region. For this, it is necessary to increase the amount of diffusion of an impurity into the optical waveguide 2. In this case, the propagation is made multi-mode in both of the horizontal and vertical directions to result in an increase of optical loss. It is thus difficult to reduce the driving voltage for these reasons.

According to a type shown in FIG. 1 (b), a dielectric layer (for example, silica or polymer) is formed on the ferroelectric substrate 5, and it is embedded in the dielectric layer 6 an optical waveguide 7 made of a ferroelectric material having a refractive index higher than that of the ferroelectric substrate 5. According to such device, it is difficult to enlarge the difference of the refractive indices of the optical waveguide 7 and substrate 5. Further, the dielectric constant of the dielectric layer 6 is relatively small compared with those of the ferroelectric substrate 5 and optical waveguide 7, so that the electric field applied on the optical waveguide 7 is low and the driving voltage is relatively high.

According a type of a device shown in FIG. 1 (c), a ridge type optical waveguide 8 made of a ferroelectric material (lithium niobate or the like) is formed on a dielectric substrate (silica or polymer) 1, and electrodes 3A and 3B are formed on the both sides thereof. Also in this case, similar to the device of FIG. 1 (b), it is difficult to increase the difference of the refractive indices of the optical waveguide and substrate. Further, the electric field intensity applied on the optical waveguide is low and the driving voltage is relatively large.

Based on these problems, the inventors have studied an optical functional device having a shape shown in, for example FIG. 2 (a). According to this device, a ferroelectric thin layer 10 is provided on a dielectric substrate 5, a core of an optical waveguide 9 is provided in the ferroelectric thin layer 10, and the dielectric substrate 5 functions as a clad. A signal electrode 3A and a ground electrode 3B are formed on the surface of the ferroelectric thin layer 10. According, to this embodiment, the optical waveguide 9 is formed by the inner diffusion of an impurity into the ferroelectric thin layer 10.

According, to this construction, as the thickness of the ferroelectric thin layer is made smaller, many of electric lines of force in the substrate between the signal electrode 3A and ground electrode 3B generated due to the application of the signal voltage is focused in the ferroelectric thin layer 10 due to the low dielectric property of the substrate 5. The intensity of the electric field in the ferroelectric thin layer is increased and the electric lines of force is particularly focused in the surface region of the thin layer contacting the electrodes.

On the other hand, according to this construction, the refractive index of the dielectric substrate 5 is relatively small. It is thus provided, in principle, a multi-mode slab waveguide having a core of the ferroelectric thin layer 10 and a clad of the dielectric substrate 5. In the case that the thickness Tsub of the ferroelectric thin layer 10 is sufficiently large, the spot size in the depth direction of high-order (first order) mode of the slab waveguide is substantially same as the thickness of the ferroelectric layer 10, and sufficiently larger than the optical spot size in the depth direction of the fundamental (zero-order) mode of the optical waveguide 9 (the spot size in the depth direction of the fundamental mode in the case Tsub=500 µm is represented as Dyo) or the spot size of propagating light in an optical fiber. Therefore, the influence of the multi-mode on the performance is negligible in the practical view, and only the fundamental mode relates to the device performance (that is, it is deemed as single mode propagation in the depth and horizontal directions in the practical view). It does not thus result in problems in the operation of the device.

As the thickness of the ferroelectric thin layer 10 is made smaller, the spot size in the depth direction of high-order (first order) mode in the slab waveguide becomes smaller corresponding with the thickness. When the thickness equals to a specific thickness (Tsub is about five times of Dyo: it depends on the production conditions of the optical waveguide and the material of the dielectric substrate), it becomes several times of the spot size in the depth direction of the fundamental mode in the optical waveguide 9. As the thickness is made smaller further, the spot size in the depth direction of the high order mode as well and the spot size of the fundamental mode become small. It is thereby proved that the optical waveguide 9 becomes multi-mode in actual operation in the direction "D" of depth of the ferroelectric thin layer 10, depending on the conditions of diffusion during, the production of the optical waveguide. In other words, it is proved that the ferroelectric thin layer 10 is like a slab optical waveguide in the direction of depth.

Further, if the confinement of light is made extremely weak as the condition of diffusion for producing an optical waveguide (for example, the film thickness or width of Ti pattern is set at a small value) and the ferroelectric thin layer 10 is sufficiently thick (for example, Tsub=500 µm), it results in so-called cut-off state. That is, it lacks the fundamental mode of the optical waveguide (lacking the confinement in the horizontal direction). Same as the above, however, as the thickness of the ferroelectric thin layer 10 is reduced to not more than a specific thickness (depending on the production conditions of the optical waveguide and the material of the dielectric substrate), it exhibits the confinement of light in the optical waveguide in the horizontal direction (the fundamental mode in the horizontal direction). The function as the optical waveguide is thereby obtained. If the thickness of the ferroelectric layer 10 is made smaller further, the spot size of the optical waveguide is reduced. Also in this case, multi-mode propagation is performed in the direction of depth.

It was investigated the relationship between the distribution of refractive index of the cross section of the central part of the optical waveguide shown in FIG. 2 (a) and the equivalent refractive index (propagation constant) of the propagating light of fundamental mode in the optical waveguide. It was thus proved that the above effect of the reduction of spot size accompanies the reduction of the equivalent refractive index based on theoretical analysis and experiments.

That is, when the thickness Tsub of the ferroelectric thin layer 10 is sufficiently large, the equivalent refractive index Neff of the optical waveguide satisfies the relationship of Nfs<Neff<Np (In the case of cut-off state, however, it is satisfied the relationship of Neff<Nfs in the slab waveguide mode of the ferroelectric substrate). Np, Nfs, Nds and Nair represent the maximum value of the refractive index of the central and surface region of the impurity-diffused portion forming the optical waveguide, the refractive index of the non-diffused portion in the ferroelectric substrate 10, the refractive index of the dielectric substrate 5 and the refractive index of an air layer. As Tsub is lowered, Neff then begins to be lowered, so that the spot size of the optical waveguide is reduced in each of the depth and horizontal directions. This corresponds with the state of multi-mode in the direction of depth as described above. As Tsub is further lowered, the relationship of Neff/Nfs is then satisfied, so that the spot size of the optical waveguide is considerably reduced in each of the depth and horizontal directions.

Further, the equivalent refractive index of light propagating in the optical waveguide may be measured by, for example, prism connection method or optical waveguide Fabry-Perot resonance method (an optical waveguide is constituted as a Fabry-Perot resonator to measure the relationship between the lengths of the resonator and the Fabry-Perot resonance wave).

When the waveguide is made multi-mode in the direction of depth of the ferroelectric thin layer 10, the confinement of light is strengthened in the horizontal direction of the optical waveguide, as well as the direction of the depth. The spot size of light is reduced in both of the depth direction "D" and width direction "W". Particularly when Tsub is two times or lower than Dyo, the spot size of the fundamental mode is considerably reduced. It is proved that the driving voltage can be thereby considerably reduced in combination with the concentration of the electric lines of power near the surface region of the ferroelectric thin layer, and the present invention is made.

BEST MODES FOR CARRYING OUT THE INVENTION

According to a preferred embodiment, an optical waveguide satisfies single mode condition in the direction "W" of width of a ferroelectric thin layer 10. In the case that the waveguide is multi-mode in the direction of width, the extinction ratio of output light tends to be deteriorated, for example, to 20 dB or lower due to the influence of mode size of an optical fiber (10 μm or smaller). It is thus preferred to maintain single mode condition in the direction of width of the ferroelectric thin layer. This can be realized by adjusting the thickness of the ferroelectric thin layer and the condition of diffusion during the formation of an optical waveguide (strength of confinement of light).

Whether light is propagated in multi-mode or single mode in the directions of width and depth of the ferroelectric thin layer can be decided by, for example, in the case of oscillation using a single-mode optical fiber, that an optical fiber is positioned with respect to the core of an optical waveguide to propagate light therein and to measure the distribution of intensity.

According to a preferred embodiment, an optical waveguide is formed by the diffusion of an impurity. The diffused impurity is not particularly limited as far as it can change the refractive index of a ferroelectric body. The optical waveguide may preferably be formed by so-called inner diffusion or ion exchange method, and for example, a titanium diffusion optical waveguide or proton exchange optical waveguide may apply.

Figure 2A:
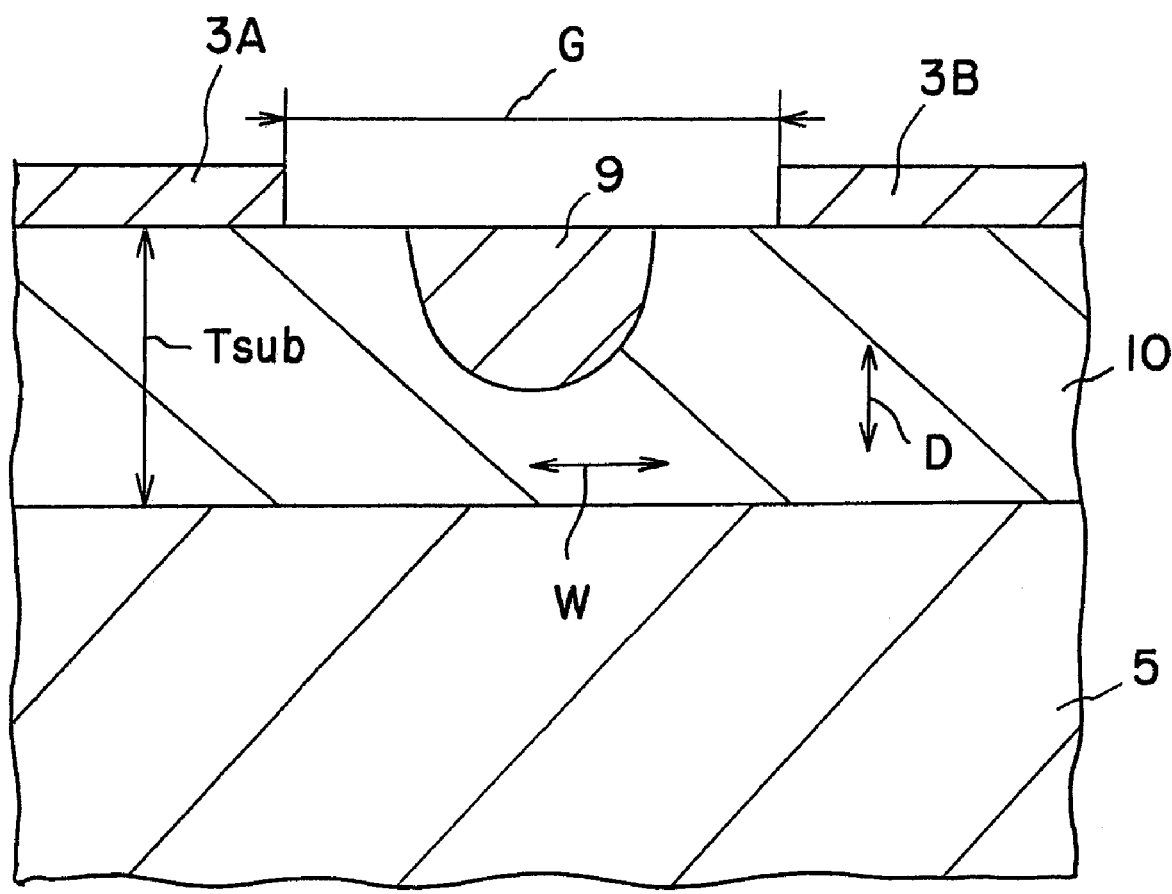
FIG. 2 (a) is a cross sectional view schematically showing an essential part of an optical functional device according to an embodiment of the present invention, and FIG. 2 (b) is a graph schematically showing the relationship of refractive indices of an air layer, a dielectric substrate, a ferroelectric thin layer and an optical waveguide.
Figure 2B:
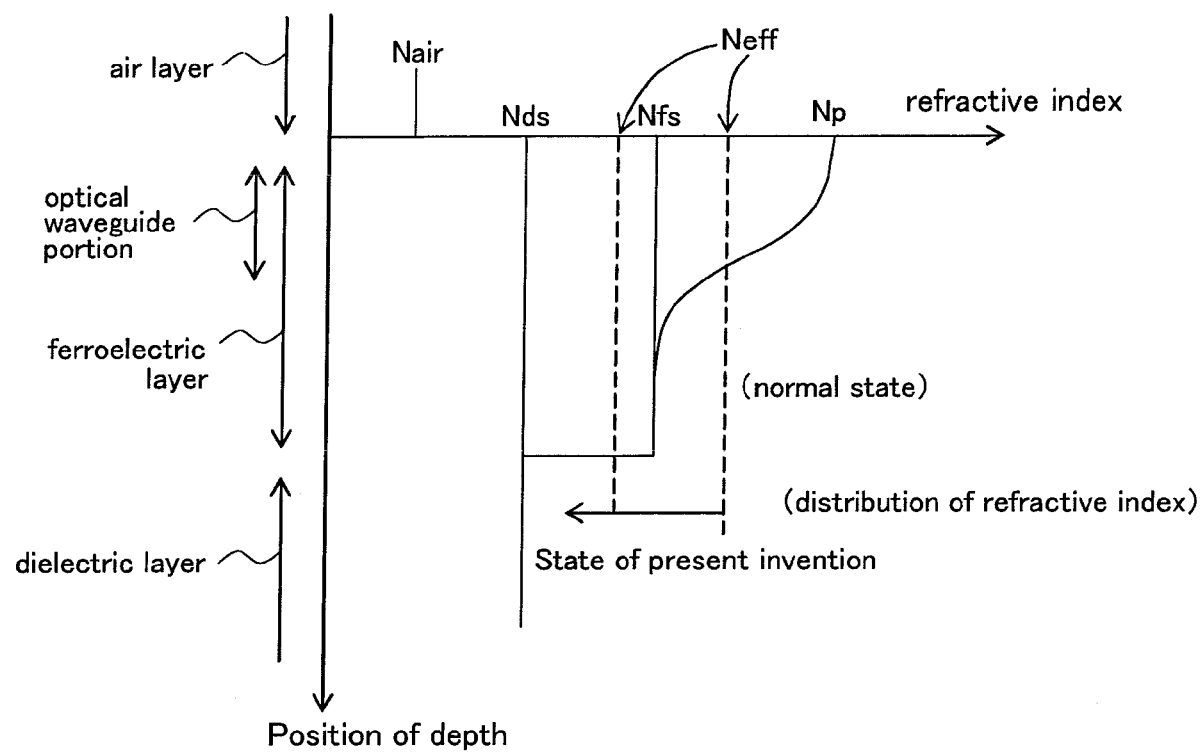

An optical functional device of FIG. 2 (a) has a dielectric substrate 5 and a ferroelectric thin layer 10. According to the present example, the thickness of the ferroelectric thin layer 10 is substantially constant. Predetermined electrodes 3A and 3B are formed on the surface of the ferroelectric thin layer. According to the present embodiment, although so-called coplanar type electrode (CPW electrode) configuration is applied, the position and shape of the electrodes are not particularly limited. For example, ACPS type may be applied. According to the present example, an optical waveguide 9 is formed between adjacent electrodes 3A and 3B, so that a signal voltage can be applied onto the optical waveguide 9 substantially in a horizontal direction. The optical waveguide constitutes so-called Mach-Zehnder type optical waveguide in a plan view, and the planar pattern is well known and omitted. An adhesive layer may be provided between the ferroelectric thin layer 10 and dielectric substrate 5.

Further, the optical waveguide may be a ridge type optical waveguide. The optical waveguide may be a ridge type optical waveguide directly formed on the surface of the ferroelectric thin layer or a ridge type optical waveguide formed on another layer on the surface of the ferroelectric thin layer.

The ridge type optical waveguide may be formed by laser or mechanical processing. Alternatively, a film of a high refractive index may be formed on the ferroelectric thin layer 10 and then processed by mechanical or laser ablation processing to produce a ridge type three-dimensional optical waveguide. The film of a high refractive index may be formed, for example, by chemical vapor deposition, physical vapor deposition, organic metal chemical vapor deposition, sputtering or liquid phase epitaxy process.

Figure 3:
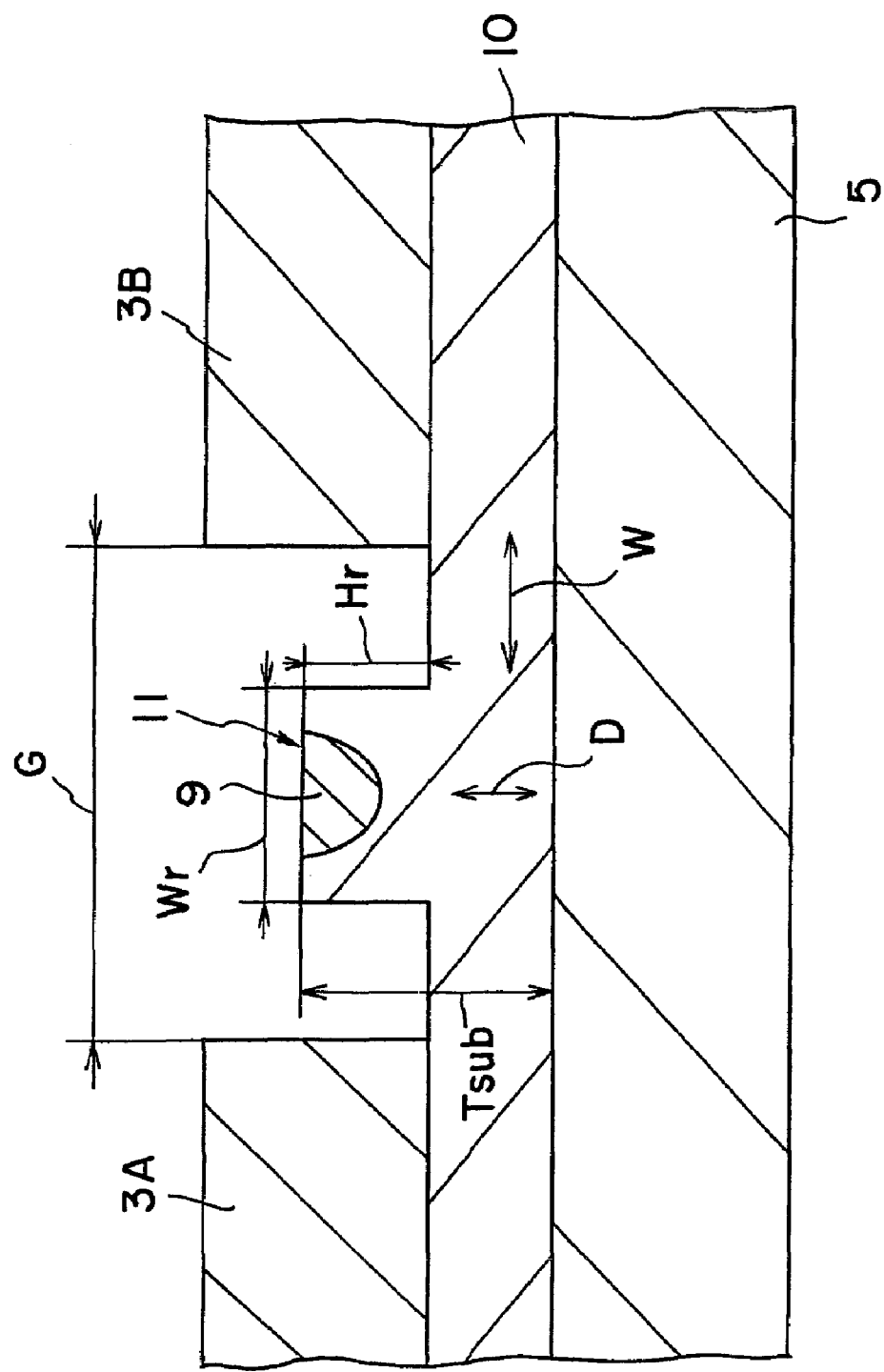
FIG. 3 is a cross sectional view schematically showing an essential part of an optical functional device according to another embodiment of the present invention, wherein a ridge portion 11 is formed.

FIG. 3 is a diagram showing an optical functional device according to this example. A ferroelectric thin layer 10 is formed on a dielectric substrate 5, and a signal electrode 3A and a ground electrode 3B are formed on the surface of the ferroelectric thin layer 10. A part of the ferroelectric thin layer is protruded between the electrodes 3A and 3B to form a ridge portion 11. According to the present example, an optical waveguide (core) 9 is formed in the ridge portion 11. Also according to this type of optical functional device, the optical waveguide 9 is made multi-mode in the direction "D" of depth and single mode in the direction "W" of width, by adjusting the conditions of diffusion of forming the optical waveguide, thickness of the ferroelectric thin layer 10 and the height "Hr" of the ridge portion. In the case that the core 9 is formed in the ridge portion 11 as described above, the size of the optical spot propagating in the optical waveguide in the direction of width can be reduced, which is effective for lowering the driving voltage.

According to a preferred embodiment, the following relationship is satisfied, provided that "Hr" is assigned to the height of the ridge portion and "Tsub" is assigned to the thickness of the ferroelectric thin layer.

$Hr/Tsub \leq 3/4$ (more preferably 2/3)

By lowering the height of the ridge portion with respect to the thickness of the ferroelectric thin layer as described above, the optical spot propagating in the optical waveguide tends to be multi-mode in the direction of depth so that the optical spot size tends to be reduced.

Further, according to a preferred embodiment, the following relationship is satisfied, provided that "G" is assigned to the gap of electrodes and Tsub is assigned to the thickness of the ferroelectric thin layer.

$G/Tsub \leq 2$ (more preferably, 1 or smaller)

Further, according to a preferred embodiment, the gap "G" of electrodes is 30 μm or smaller. "G" may more preferably be 25 μm or smaller.

By lowering the gap as described above, it is possible to increase the electric field intensity applied on light propagating in the optical waveguide to reduce the driving voltage of the optical functional device.

Further, the thickness of the ferroelectric thin layer is generally 100 μm or smaller, may preferably be 50 μm or smaller, more preferably be 40 μm or smaller and most preferably be 25 μm or smaller. Further, in the case that the shape of the waveguide is of a ridge structure, the thickness of the ferroelectric thin layer may preferably br 8 μm or smaller and more preferably be 6 μm or smaller. By lowering the thickness of the ferroelectric layer as described above, the waveguide tends to be multi-mode in the direction "D" of depth, although the mode depends on the conditions and species of the diffusion for forming the optical waveguide.

According to a particularly preferred embodiment, when an optical waveguide is formed in a ferroelectric substrate composed of the same material as the ferroelectric thin layer and having a thickness of 500 μm, the following relationship is satisfied, provided that Dyo is assigned to the diameter of the optical spot propagating in the optical waveguide.

$Tsub/Dyo \leq 5$ (particularly preferably 2 or smaller)

That is, provided that Dyo is assigned to the diameter of the optical spot in the case that the thickness of the ferroelectric thin layer would be made sufficiently large to 500 μm, single mode condition is maintained as far as the thickness Tsub of the ferroelectric thin layer is large. As Tsub is made smaller, however, light is made multi-mode in the direction "D" of depth so that the optical spot size is reduced.

Further, when the confinement of light in the optical waveguide is weak, the effects tend to be realized in the case that $Tsub/Dyo \leq 1$.

Further, Dyo represents the spot size of the optical waveguide in the substrate having a thickness of 500 μm and made of the same material as the ferroelectric thin layer. This is a spot size, when an optical waveguide would be formed in a substrate having a thickness of 500 μm and made of the same material as the ferroelectric thin layer to be measured, under the same manufacturing conditions as the optical waveguide to be measured. Generally, after an optical waveguide is formed in the substrate having a thickness of 500 μm, the optical spot size is first measured to which Dyo is assigned. The substrate is processed from a face of substrate opposite to the optical waveguide for thinning to form the ferroelectric thin layer.

The material of the ferroelectric thin layer is composed of a ferroelectric electro-optic material and may preferably be made of a single crystal. Although such single crystal is not particularly limited as far as the modulation of light is possible, the crystal includes lithium niobate, lithium tantalate, a solid solution of lithium niobate-lithium tantalate, potassium lithium niobate, KTP, GaAs and quartz. Lithium niobate, lithium tantalite and a solid solution of lithium niobate-lithium tantalite are most preferable.

The materials of the electrodes are not particularly limited as far as the material is excellent in impedance characteristic, and may be composed of gold, silver, copper or the like.

Although an electrode is provided on the surface of the ferroelectric thin layer, the electrode may be directly formed on the surface of the ferroelectric thin layer, or may be formed through a low dielectric layer or a buffer layer. The low dielectric layer or buffer layer may be made of known materials such as silicon oxide, magnesium fluoride, silicon nitride and alumina. The term "low dielectric layer" means a layer made of a material having a dielectric constant lower than the dielectric constant of the material forming the ferroelectric thin layer. The dielectric constant of the material is preferably lower on the viewpoint of satisfying the velocity matching condition of light and micro wave.

Figure 4:
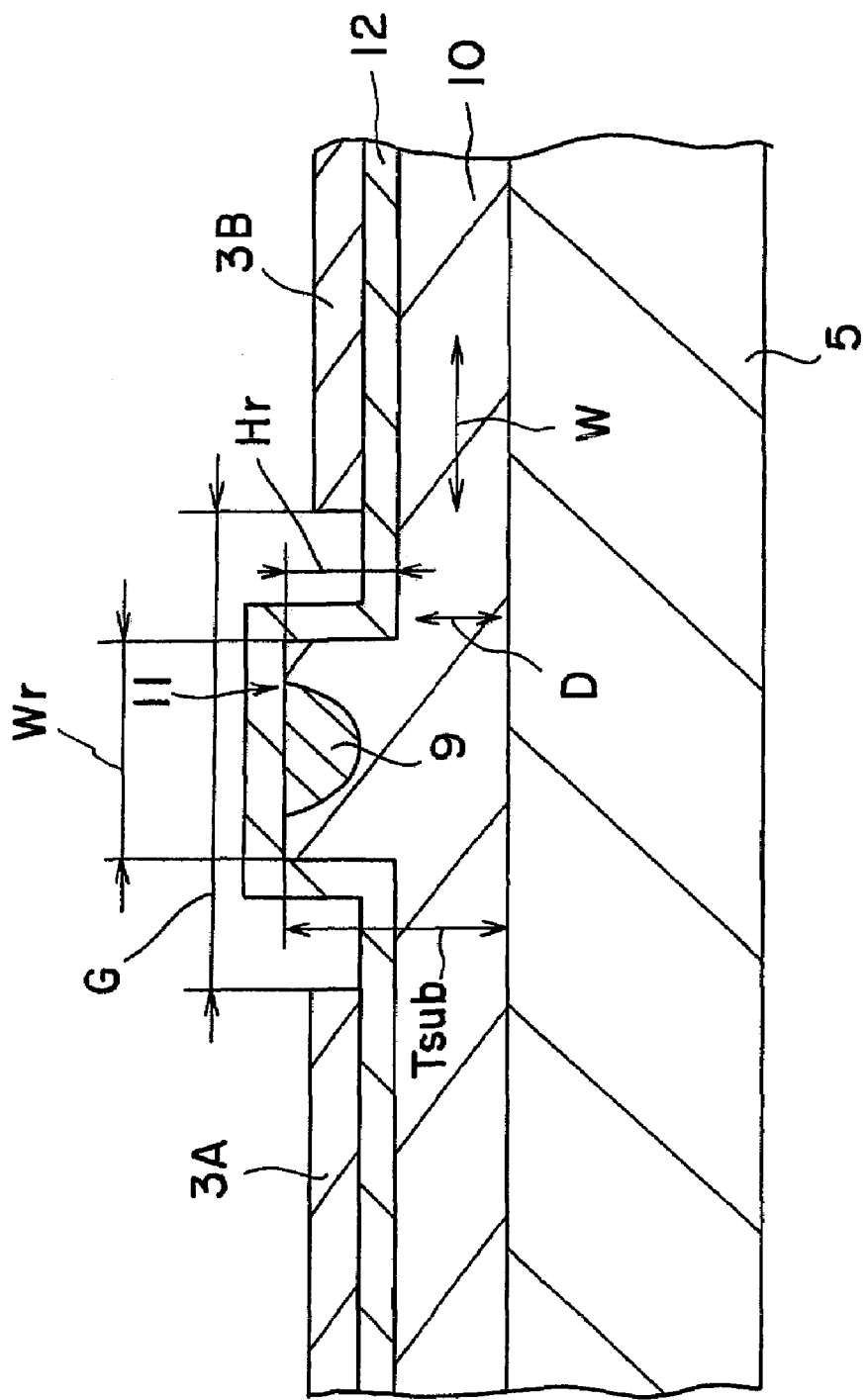
FIG. 4 is a cross sectional view schematically showing an essential part of an optical functional device according to still another embodiment of the present invention, wherein a buffer layer 12 is formed on the surface of an ferroelectric thin layer 10.

For example, according to an optical functional device shown in FIG. 4, the surface of the ferroelectric thin layer 10 is covered with a buffer layer 12, and electrodes 3A and 3B are formed on the buffer layer 12.

Figure 5:
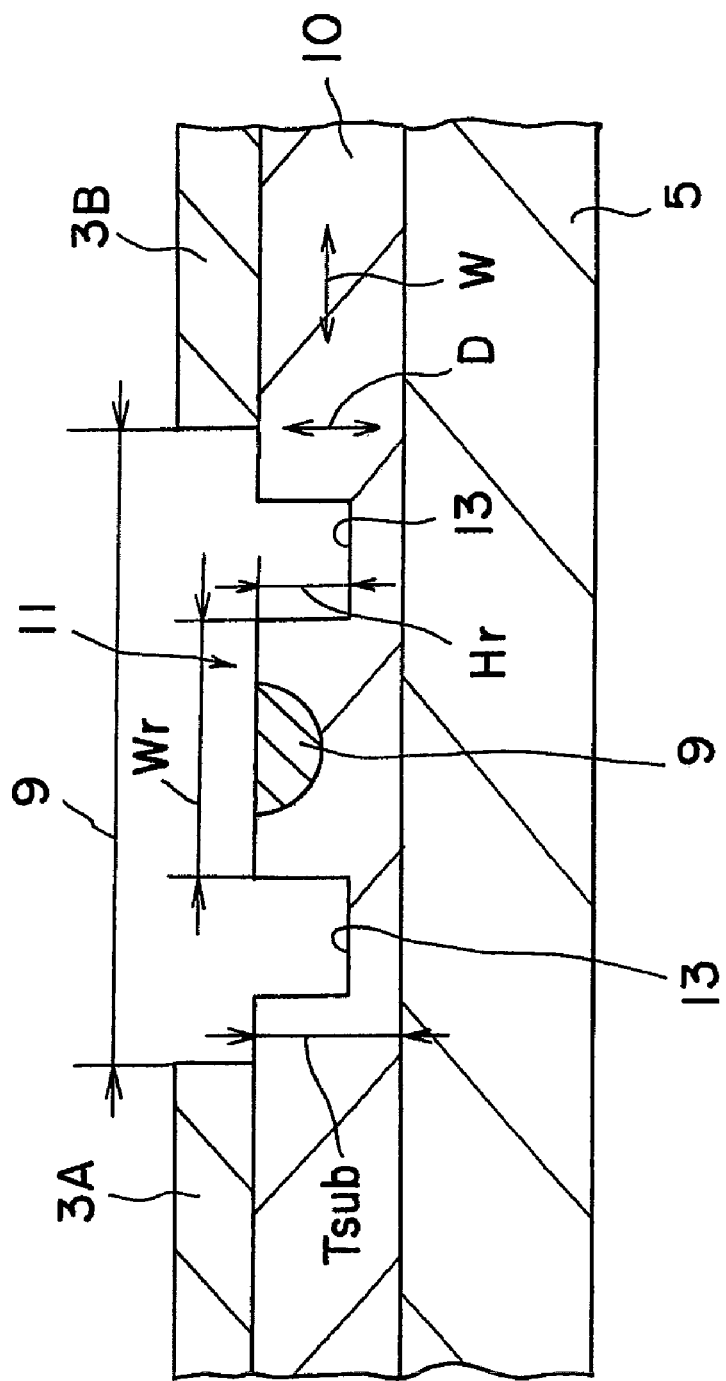
FIG. 5 is a cross sectional view schematically showing an essential part of an optical functional device according to still another embodiment of the present invention, wherein grooves are formed on both sides of a ridge portion 11.

Further, a groove may be formed in the ferroelectric thin layer 10. For example, according to an optical functional device shown in FIG. 5, elongate grooves 13 are formed on both sides of the ridge portion 11. According to the present example, the depth of the groove 13 is same as the height Hr of the ridge portion. In the case that the groove is formed in the ferroelectric thin layer 10 to form the whole or a part of the ridge portion, it is easier to make the propagating light multi mode compared with the case that no such groove is formed.

Figure 6:
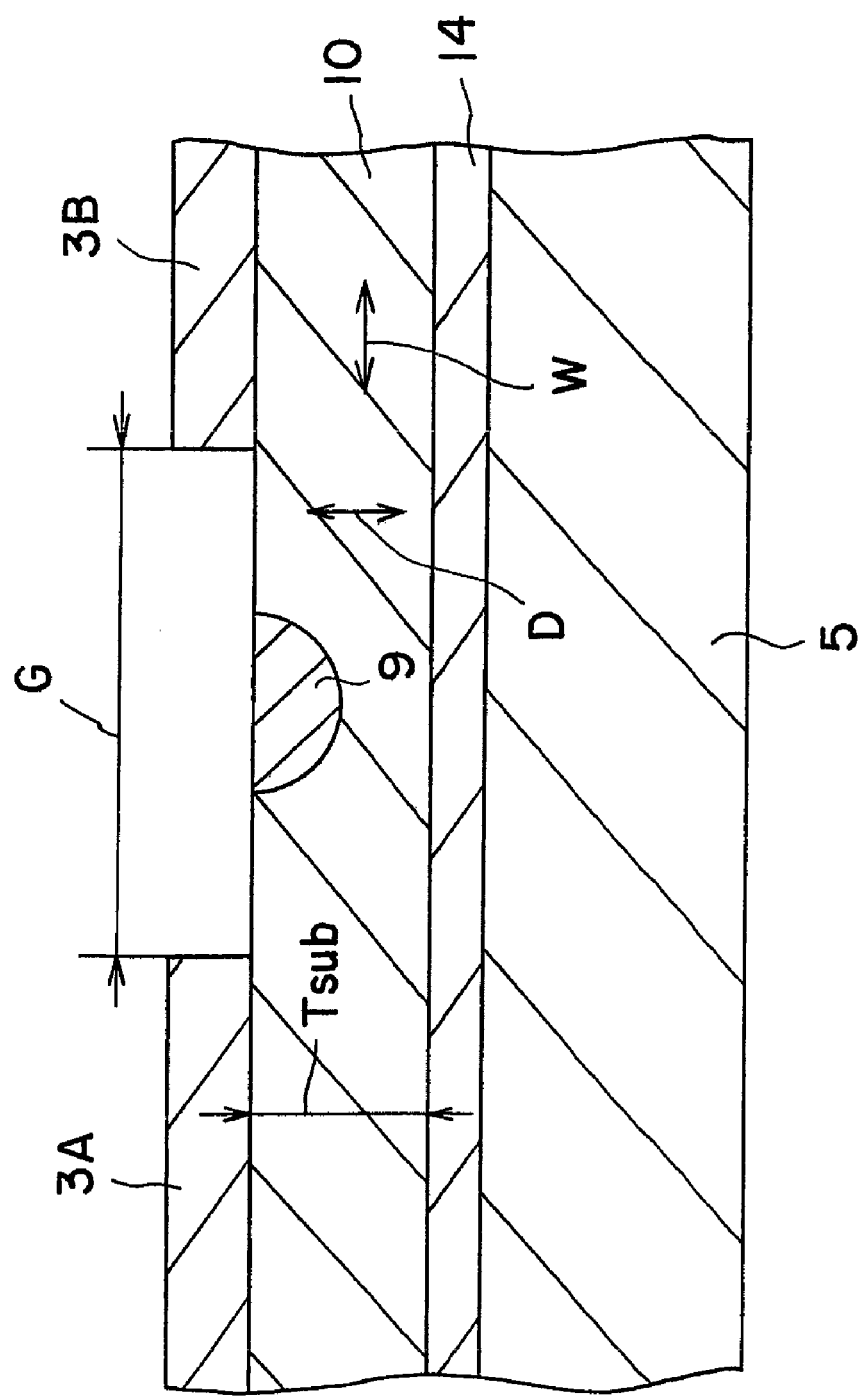
FIG. 6 is a cross sectional view schematically showing an essential part of an optical functional device according to still another embodiment of the present invention, wherein a ferroelectric thin layer 10 and a dielectric substrate 5 are adhered by an adhesive layer 14.

Further, as shown in FIG. 6, the ferroelectric thin layer 10 is adhered with the dielectric substrate 5 through an adhesive layer 14. Although specific examples of the adhesives are not particularly limited, they include an epoxy resin type adhesive, thermal setting resin type adhesive, ultraviolet curable resin type adhesive and "Alon Ceramics C" (trade name: manufactured by Toa Gosei: thermal expansion coefficient of $13 \times 10^{-6}$/K) having a thermal expansion coefficient relatively close to that of the material having electro-optic effect such as lithium niobate.

Further, the adhesive glass may preferably be that having a low dielectric constant and a temperature suitable for adhesion (working temperature) of about 600° C. or lower. Further, it is preferred that a sufficient adhesive strength can be obtained after the processing. Specifically, so-called solder glass containing a composition of a plurality of ingredients such as silicon oxide, lead oxide, aluminum oxide, magnesium oxide, calcium oxide, boron oxide or the like.

Further, a sheet of an adhesive may be provided between the ferroelectric thin layer 10 and dielectric substrate 5 to adhere them. Preferably, a sheet made of a thermal setting, light curable or light thickening resin adhesive is provided between the back face of the main body 4 and the supporting body and cured. Such sheet may appropriately be a resin film having a thickness of 300 μm or smaller.

In the ferroelectric thin layer, the polarization axis of the crystal may preferably be substantially parallel with the first main face (surface) of the substrate. In this case, it is preferred an X-cut or Y-cut of lithium niobate single crystal, lithium tantalate single crystal, or single crystal of solid solution of lithium niobate-lithium tantalate. FIGS. 1 to 6 show examples where the present invention is applied to an X-cut or Y-cut.

Figure 7:
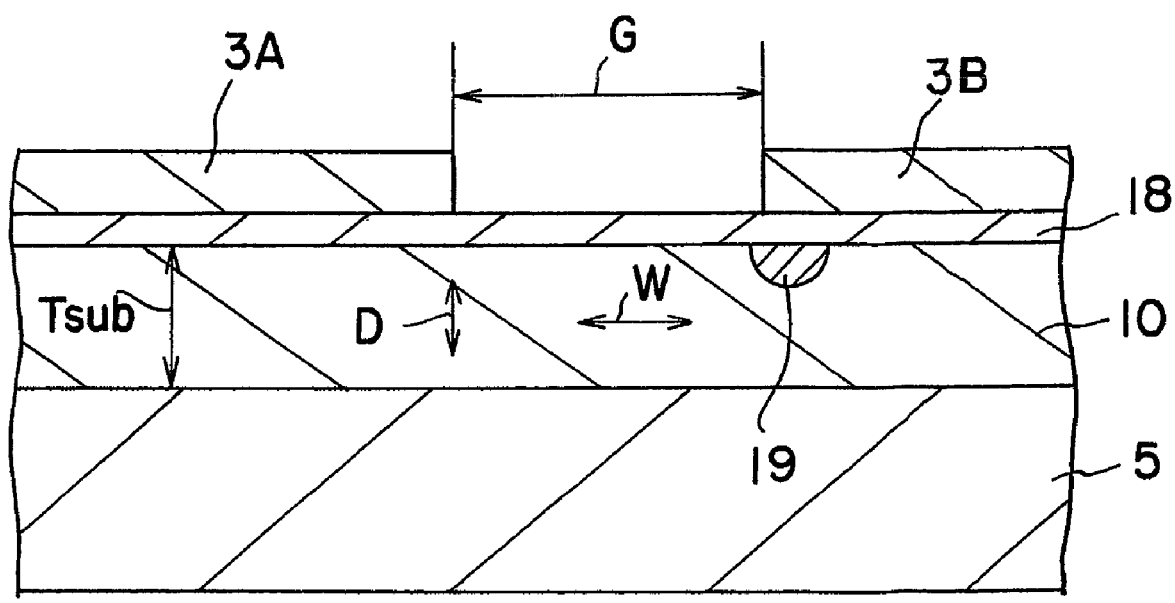
FIG. 7 is a cross sectional view schematically showing an essential part of an optical functional device according to still another embodiment of the present invention, wherein a Z-cut is used as the ferroelectric thin layer 10.

Further, according to another preferred embodiment, the polarization axis of the crystal forming the ferroelectric thin layer is substantially perpendicular to the first main face (surface) of the substrate. In this case, it is preferred a Z-cut of lithium niobate single crystal, lithium tantalate single crystal, or single crystal of solid solution of lithium niobate-lithium tantalate. In this case, as shown in FIG. 7, the optical waveguide 19 is positioned under the electrode. Further, in the case that Z-cut is used, the optical waveguide is needed to be positioned direct under the electrode. It is thus preferred to further provide a buffer layer 18 between the surface of the substrate and electrode for reducing the propagation loss of light.

The material of the dielectric substrate 5 is not particularly preferred, and includes a glass such as quartz glass and a polymer. According to a preferred embodiment, the minimum value of the thermal expansion coefficient of the ferroelectric thin layer 10 is ⅕ or larger of the minimum value of the thermal expansion coefficient of the dielectric substrate 5, and the maximum value of the thermal expansion coefficient of the ferroelectric thin layer 10 is 5 times or smaller of the maximum value of the thermal expansion coefficient of the dielectric substrate 5.

When each of the electro-optic materials forming the ferroelectric thin layer 10 and dielectric substrate 5 has no anisotropy in thermal expansion coefficient, the minimum and maximum values of the thermal expansion coefficient are the same in each of the ferroelectric thin layer 10 and dielectric substrate 5. When each of the electro-optic materials forming ferroelectric thin layer 10 and dielectric substrate 5 is anisotropic in thermal expansion coefficient, the thermal expansion coefficient may be changed for the respective axes. For example, when the electro-optic material forming the ferroelectric thin layer 10 is lithium niobate, the thermal expansion coefficients for X axis and Y axis are $16 \times 10^{-6}/°$ C., respectively, which is the maximum value. The thermal expansion coefficient in Z axis is $5 \times 10^{-6}/°$ C., which is the minimum value. Therefore, the minimum value of the thermal expansion coefficient of the dielectric substrate 5 is made $1 \times 10^{-6}/°$ C. or larger, and the maximum value of the thermal expansion coefficient of the ferroelectric thin layer 10 is made $80 \times 10^{-6}/°$ C. or smaller. For example, the thermal expansion coefficient of quartz glass is $0.5 \times 10^{-6}/°$ C. and thus smaller than $1 \times 10^{-6}/°$ C., for example.

On the viewpoint, the minimum value of thermal expansion coefficient of the dielectric substrate 5 may more preferably be ½ or larger of the minimum value of thermal expansion coefficient of the ferroelectric thin layer 10. Further, the maximum value of thermal expansion coefficient of the dielectric substrate 5 may more preferably be 2 times or smaller of the maximum value of that of the ferroelectric thin layer 10.

Specific examples of the material of the dielectric substrate are not particularly limited, as far as the above conditions are satisfied. The material includes lithium niobate, lithium tantalate, a solid solution of lithium niobate-lithium tantalate and potassium lithium niobate. In this case, the ferroelectric thin layer and dielectric substrate is preferably made of the same material on the viewpoint of thermal expansion coefficient, and lithium niobate single crystal is particularly preferred.

Although the function of the optical functional device is not limited, an optical modulator is preferred. Functions other than optical modulator includes any optical functional devices utilizing the electro-optic effects of a ferroelectric material, such as an optical switch, a polarization rotator, an electric field or magnetic field sensor and the like.

EXAMPLES (Experiment 1)

The optical modulator 1 shown in FIG. 2 (a) is produced. Specifically, a substrate composed of a 3-inch X-cut wafer ($LiNbO_3$ single crystal) is used, and an optical waveguide 3 of Mach-Zehnder type is formed on the surface of the wafer, by titanium diffusion process and photolithography method. The thickness Tti of the titanium layer before the diffusion is made 0.08 μm and the width Wti is made 7 μm for making the confinement of light weaker compared with that in prior arts. Further, the treating temperature during the titanium diffusion is made 1050° C.

CPW electrode pattern is then formed by plating process. The gap "G" between the signal electrode 3B and ground electrode 3A is made 40, 30, 25, 20, 15, 10, 5 or 2 μm and the electrode length is made 35 mm. Then, for thinning, a dummy substrate is adhered to a polishing surface plate, and the modulator substrate is adhered thereon with a thermoplastic resin with the electrode face orientated downwardly. Further, the substrate is processed for thinning to obtain the ferroelectric thin layers 10 having various thicknesses (2 to 15 μm) shown in FIG. 8, by horizontal polishing and polishing (CMP). Thereafter, a flat-plate shaped dielectric substrate 5 is adhered and fixed to the ferroelectric thin layer 10, the end face for the connection to an optical fiber is polished, and the wafer is cut into chips by dicing. A film of epoxy resin and having a thickness of 50 μm is used as a resin for the adhesion and fixation. The width of the chip and the total thickness including the reinforcing substrate are made 4.4 mm and 1 mm, respectively. A single core fiber array holding a 1.55 μm band panda fiber is connected to the input side and a single core fiber array holding a single mode optical fiber is connected to the output side of a traveling type optical modulator chip. The optical fibers and optical waveguide are adjusted at the axes and adhered with each other by a ultraviolet curable resin.

Figure 1:
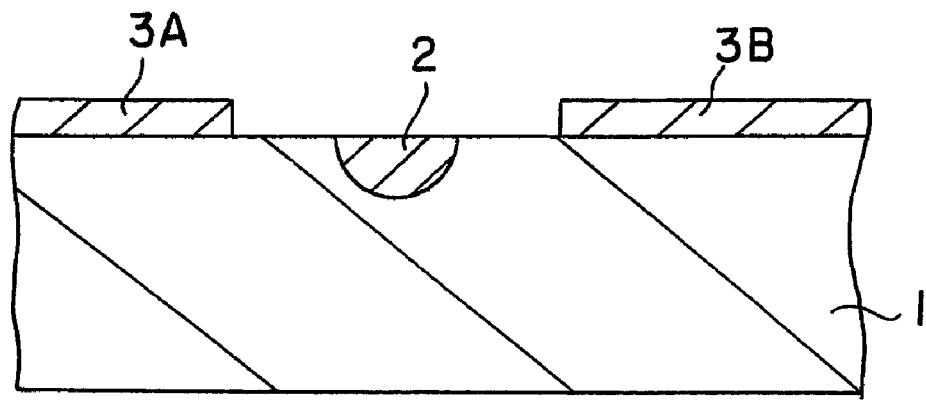
FIGS. 1 (a), 1 (b) and 1 (c) are cross sectional views schematically showing essential parts of various types of optical modulation devices, respectively.
Figure 1:
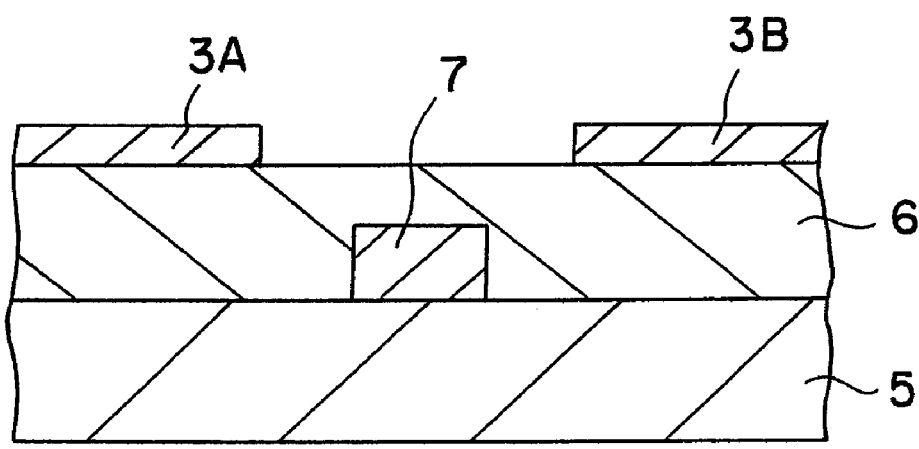
Figure 1:
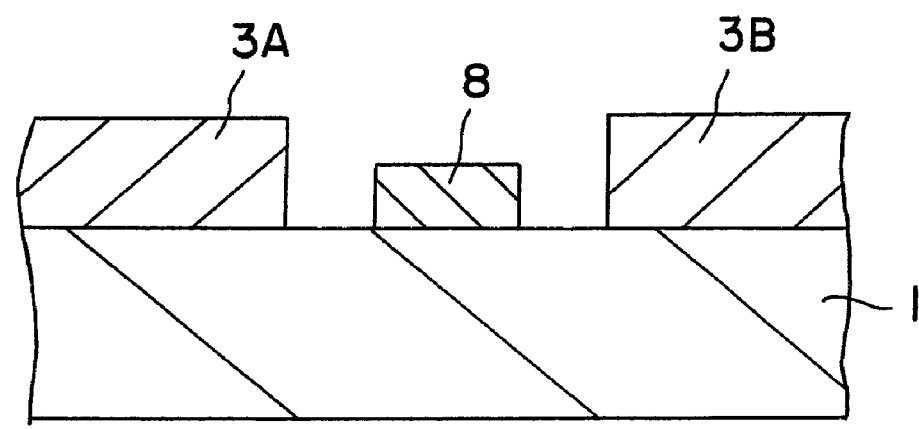

Further, each of the optical modulators shown in FIGS. 1 (a) to (c) was produced. However, the material of the ferroelectric substrate and the process of diffusing titanium were the same as those described above. The thickness of each of the ferroelectric substrates 1 and 5 were made 500 μm. The refractive index of non-diffusion portion of the ferroelectric substrate Nfs was 2.137.

Figure 8:
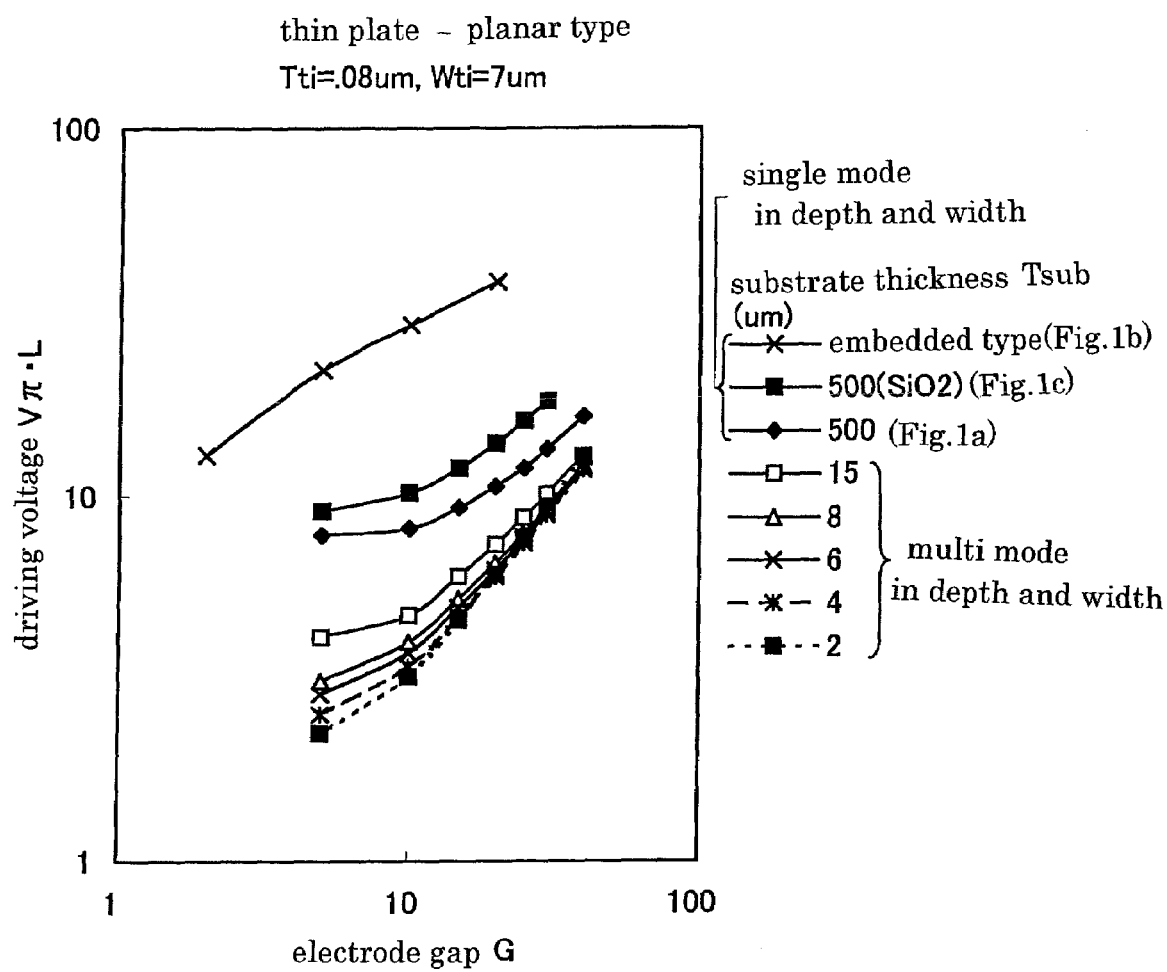
FIG. 8 is graph showing the relationship of a gap "G" of electrodes, a driving voltage and a substrate thickness Tsub.

FIG. 8 shows the relationship of the electrode gap "G" and the driving voltage Vπ·L for each of the optical modulators. According to the device shown in FIG. 1 (c) and having a thickness Tsub of 15 μm or smaller, the spot size Dyo in the direction of depth of the propagating light is about 4 μm and the equivalent refractive index Neff of the optical waveguide was 2.143 to 2.141 (the refractive index Nfs of non-diffused region of the ferroelectric layer was 2.137), provided that the thickness of the substrate during the production of a sample was 500 μm. According to the devices shown in FIGS. 1 (a), 1(b) and 1 (c), the propagating light is of single mode in both of the directions of depth "D" and width "W". Contrary to this, according to examples where the thickness Tsub of the substrate is 20 μm or smaller, the propagating light proved to be of multi mode in both of the directions of depth "D" and width "W". As a result, due to the reduction effect of the optical spot size, the driving voltage was generally lowered. Further, according to the example where Tsub was 8 μm or smaller, the equivalent refractive index Neff was 2.140 or lower to prove that the driving voltage was considerably affected and lowered in response to the reduction of "G".

According to the example where Tsub is 5 μm or lower, the equivalent refractive index Neff becomes 2.137 or lower so that the driving voltage can be considerably reduced further.

(Experiment 2)

Figure 9:
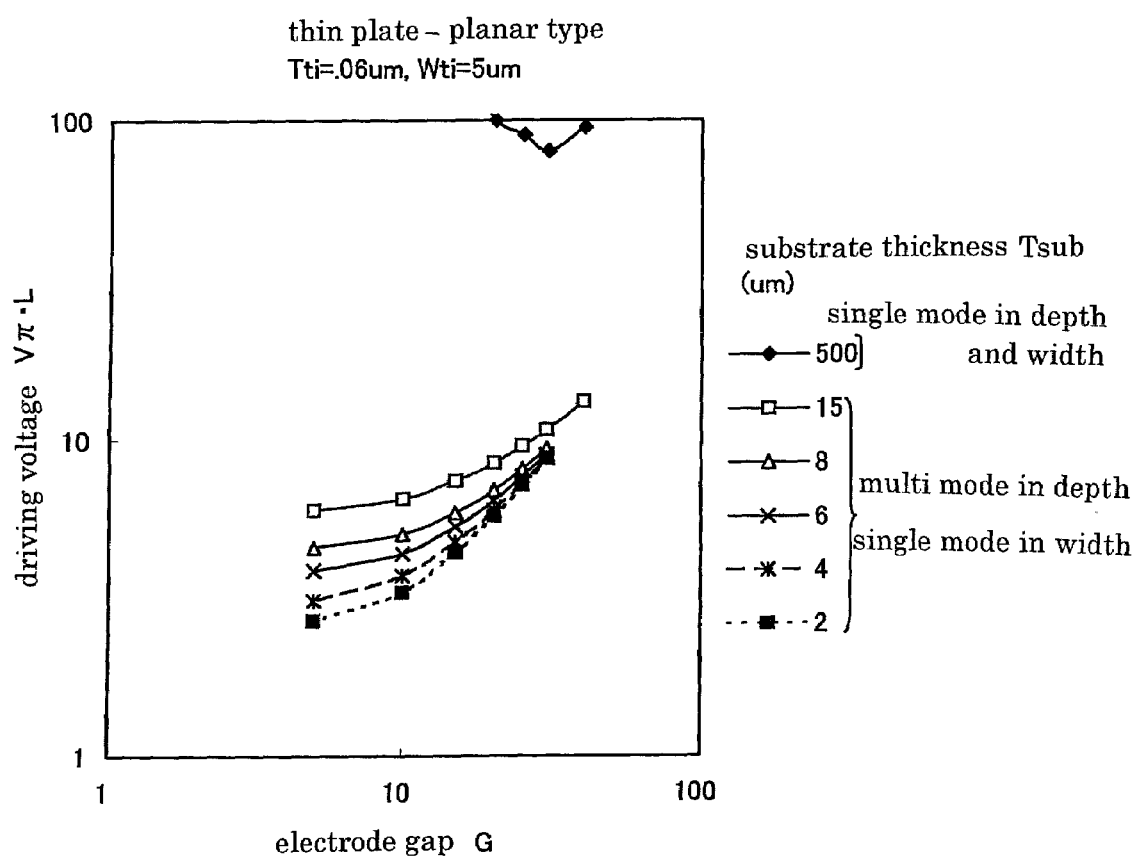
FIG. 9 is a graph showing the relationship of a gap "G" of electrodes, a driving voltage and a substrate thickness Tsub.

The optical modulation device of FIG. 2 (a) was produced by the same procedure as the experiment 1, under the conditions shown in each example of FIG. 9. However, the thickness Tti of titanium layer for the diffusion of titanium was made 0.06 μm, and the width Wti was made 5 μm. The thickness Tsub of the ferroelectric thin layer was changed in a range of 15 to 2 μm in addition to 500 μm. FIG. 9 shows the relationship of the electrode gap "G" and the driving voltage Vπ·L. According to the present example, the amount of titanium for the titanium diffusion was smaller than that used in the experiment 1, so that the confinement of light was relatively weak.

In the case that the substrate thickness was 500 μm, the spot size Dyo in the direction of depth of the propagating light was about 100 μm, and the equivalent refractive index Neff of the optical waveguide was 2.1371, which was slightly larger than the refractive index Nfs of 2.137 in the non-diffused portion of the ferroelectric thin layer. The propagating light proved to be single mode in both of the directions of depth "D" and width "W". Contrary to this, according to the example where the substrate thickness Tsub is 15 μm or smaller and Neff is 2.137 or lower (Neff is 2.135 when Tsub is 6 μm), the propagating light is proved to be multi mode in the direction "D" of depth and single mode in the direction "W" of width. As a result, as the driving voltage is generally lowered, it is proved that the driving voltage sharply responds with the reduction of "G" and is considerably lowered due to the effect of reduction of the optical spot size.

(Experiment 3)

Figure 10:
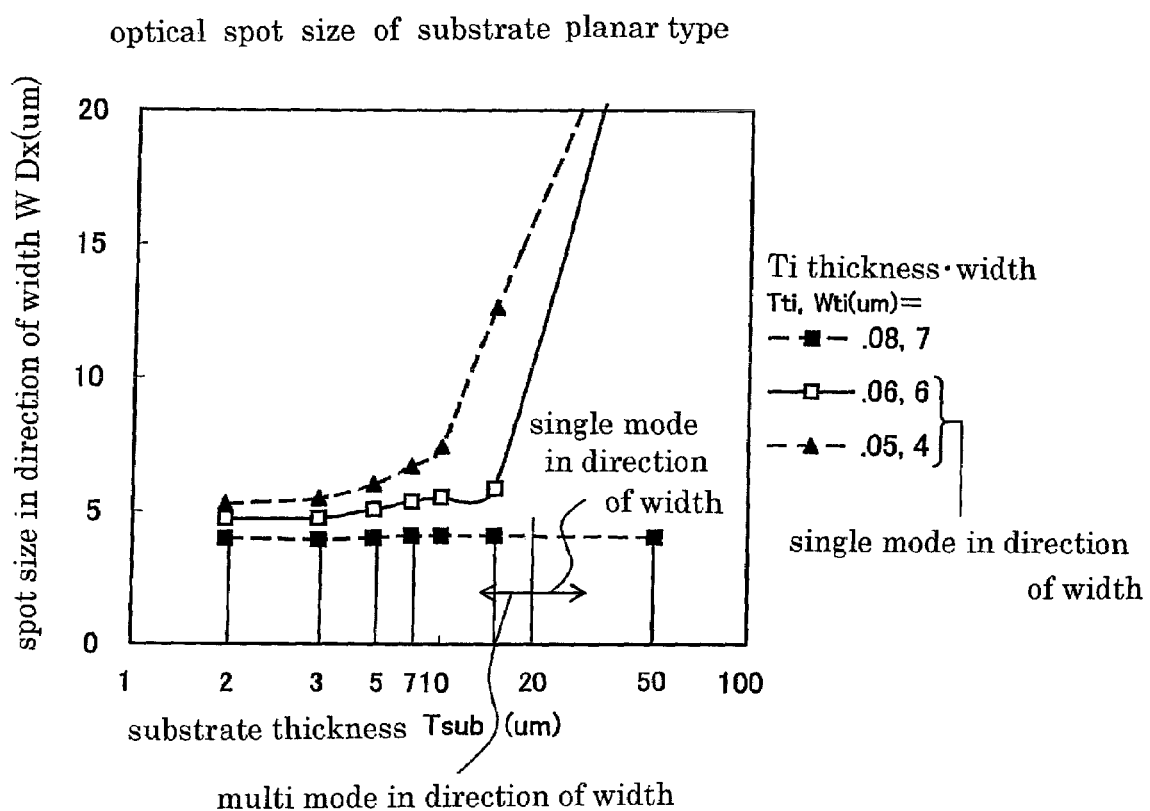
FIG. 10 is a graph showing the relationship of the width and thickness of a titanium layer, a substrate thickness and the optical spot size in the direction of width.
Figure 11:
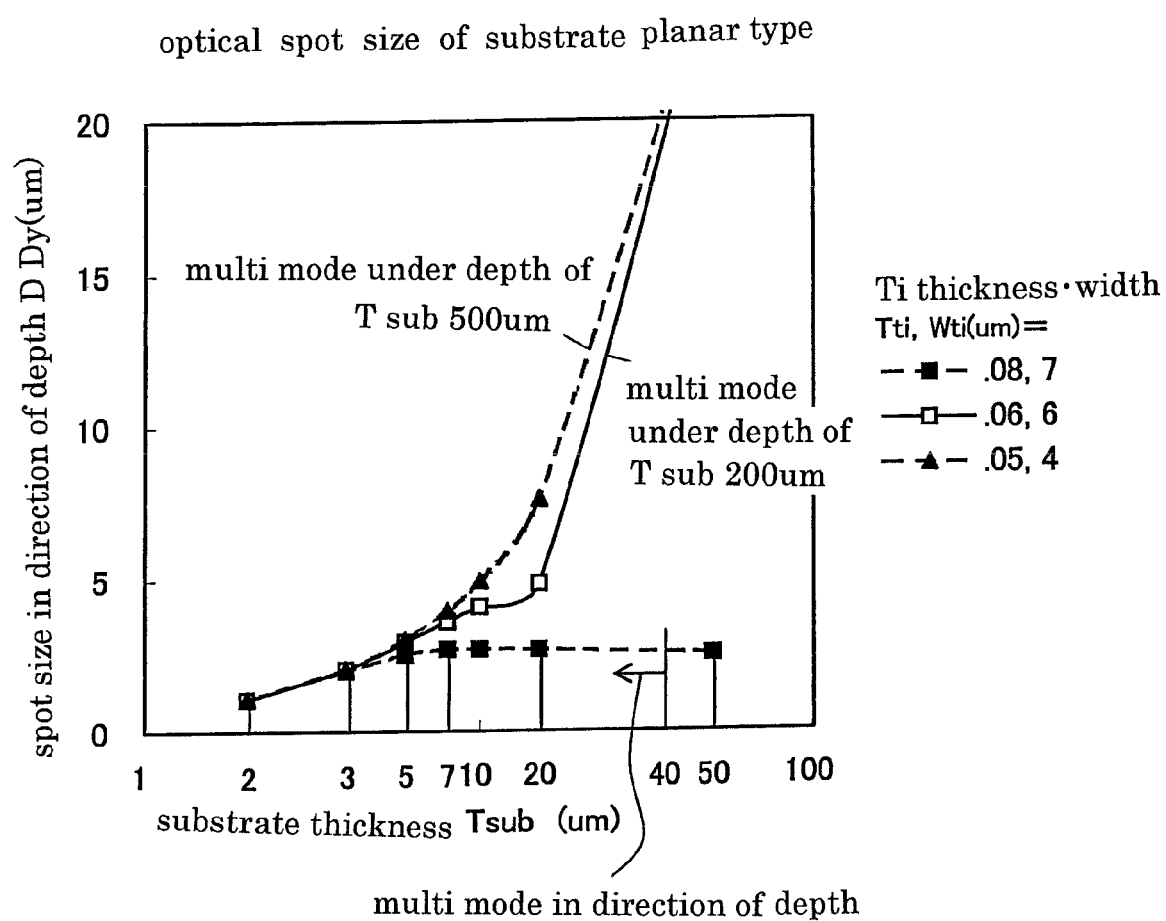
FIG. 11 is a graph showing the relationship of the width and thickness of a titanium layer, a substrate thickness and the optical spot size in the direction of depth.

The optical modulating device was produced under the conditions shown in examples of FIG. 10, by the same procedure as the experiment 1. However, the thickness Tti and width Wti of the titanium layer for the titanium diffusion were changed as shown in FIG. 10. FIG. 10 shows the relationship between the optical spot size in the direction "W" of width and the substrate thickness Tsub. FIG. 11 shows the relationship between the optical spot size in the direction "D" of depth and the substrate thickness Tsub.

In the case that Tti is 0.08 μm and Wti is 7 μm, Dyo is 4 μm and Neff is 2.141 when Tsub is 500 μm. Although the optical spot size is not substantially changed at Tsub of 20 μm or larger, Neff is 2.141 or lower when Tsub is 10 μm or smaller and Neff is 2.137 when Tsub is 4 μm or smaller, so that the optical spot size is considerably decreased in the direction of depth. According to the case that Tti is 0.06 μm and Wti is 5 μm (Neff is 2.1371 and Dyo is 100 μm when Tsub is 500 μm), the optical spot is single mode in the direction "W" of depth and multi mode in the direction "D" of depth, that is, Neff is 2.137 or lower when Tsub is 200 μm or lower. However, in the case Tsub is 100 μm or larger, the spot sizes in the directions of width and depth are large and thus impractical.

In the case that Tti is 0.05 μm and Wti is 4 μm (Dyo is about 500 μm; cut-off state with no confinement in the direction "W" of width), Neff is 2.136 or smaller when Tsub is 100 μm or smaller so that the optical spot size is considerably reduced. However, in the case that Tsub is 100 μm or larger, cut-off state is provided with no confinement in the direction "W" of width, so that it does not substantially function as a device.

(Experiment 4)

Figure 12:
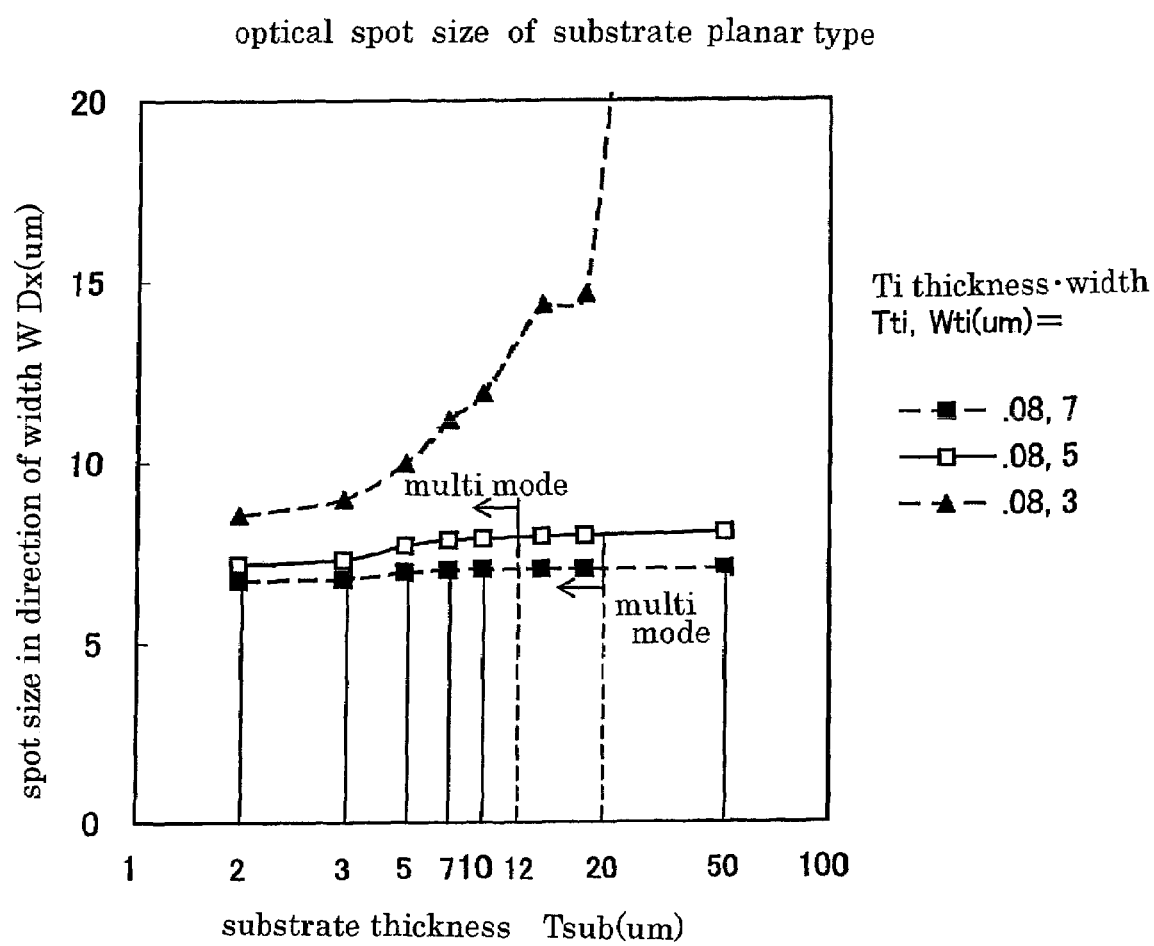
FIG. 12 is a graph showing the relationship of the width and thickness of a titanium layer, a substrate thickness and the optical spot size in the direction of width.
Figure 13:
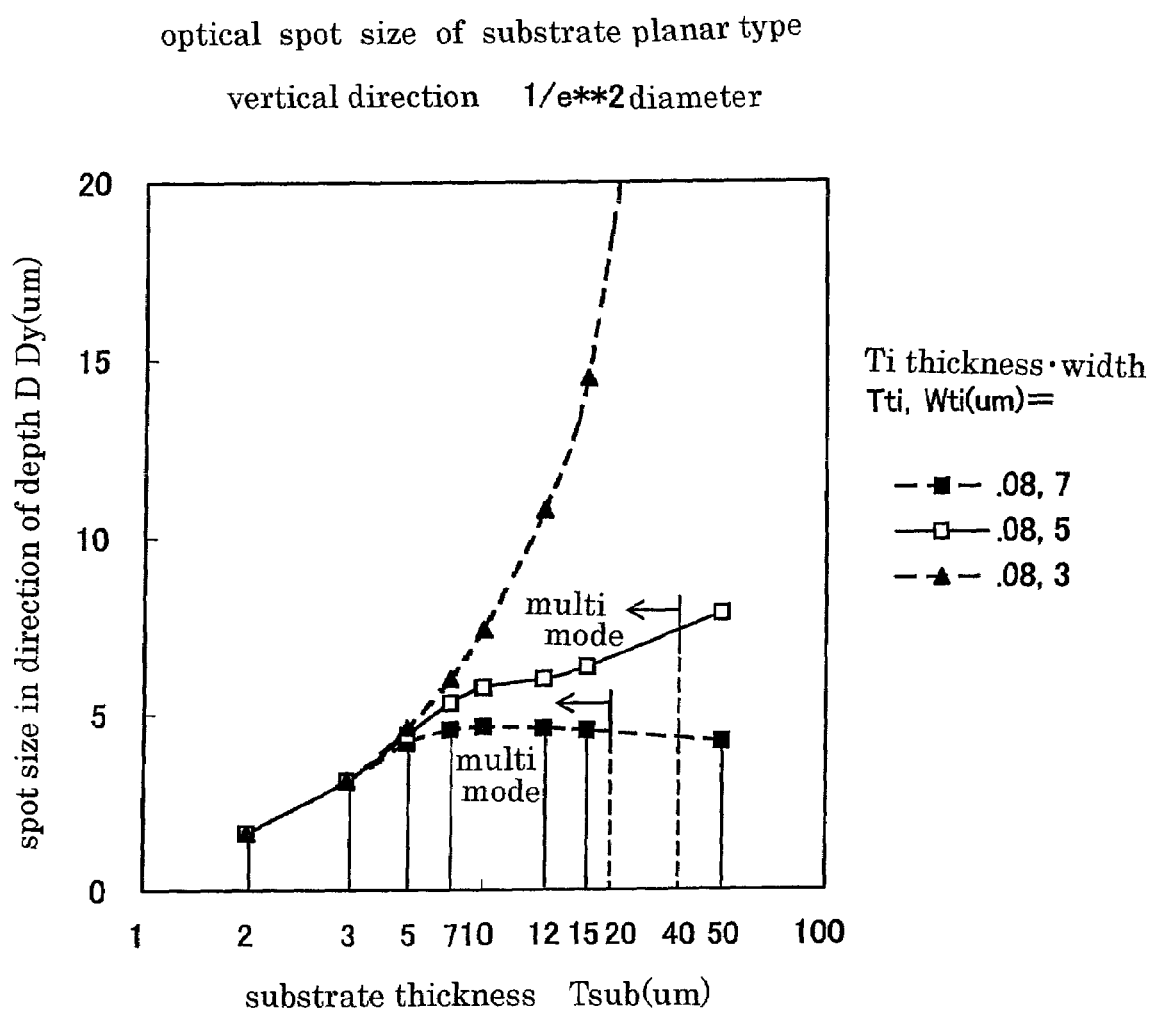
FIG. 13 is a graph showing the relationship of the width and thickness of a titanium layer, a substrate thickness and the optical spot size in the direction of depth.

The optical modulating device shown in FIG. 2 (a) was produced under the conditions shown in each example of FIG. 12, by the same procedure as the experiment 1. However, the thickness Tti and width Wti of the titanium layer for the titanium diffusion were changed as shown in FIG. 12. FIG. 12 shows the relationship between the optical spot size in the direction "D" of depth and the substrate thickness Tsub. FIG. 13 shows the relationship between the optical spot size in the direction "D" of depth and substrate thickness Tsub.

In the case that Tti is 0.08 μm and Wti is 3 μm, Dyo is about 500 μm (cut-off state). In this case, cut-off state is provided at Tsub of 50 μm or more, so that it does not substantially function as a device. The effect of confinement of light in the horizontal direction "W" is provided at Tsub of 40 μm or smaller, so that the equivalent refractive index Neff is 2.137 or lower, and single mode is realized in the direction of width. Multi mode is realized at Tsub of 500 μm or smaller in the direction "D" of depth. According to the case that Tti is 0.08 μm and Wti is 5 μm (Neff is 2.138 and Dyo is 9 μm at Tsub of 500 μm), Neff is 2.138 or lower to multi mode at Tsub of 12 μm or smaller in the direction "W" of width and multi mode state is obtained at Tsub of 40 μm or smaller in the direction "D" of depth. In the case that Tti is 0.08 μm and Wti is 7 μm (Neff is 2.141 and Dyo is 4 μm when Tsub is 500 μm), Neff becomes 2.14 or lower to multi mode at Tsub of 20 μm or smaller in the direction "W" of width and multi mode is obtained at Tsub of 20 μm or smaller in the direction "D" of depth.

(Experiment 5)

Figure 14:
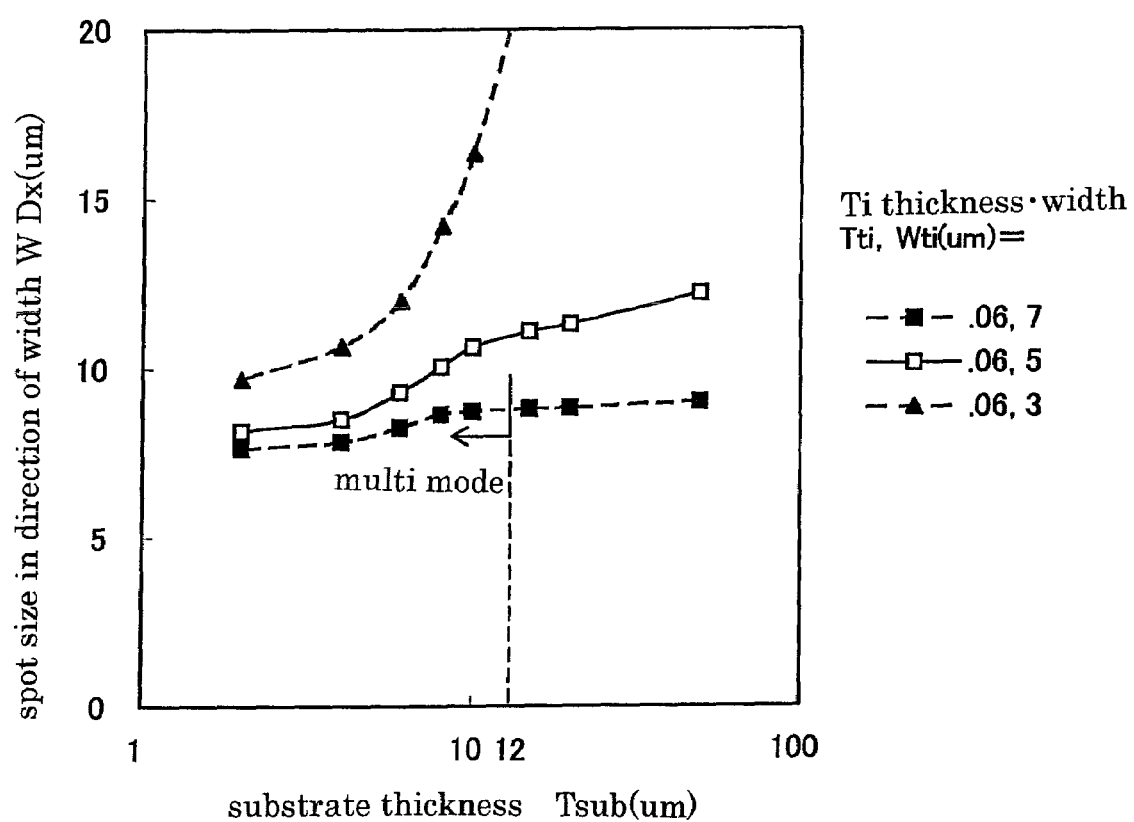
FIG. 14 is a graph showing the relationship of the width and thickness of a titanium layer, a substrate thickness Tsub and the optical spot size in the direction of width.
Figure 15:
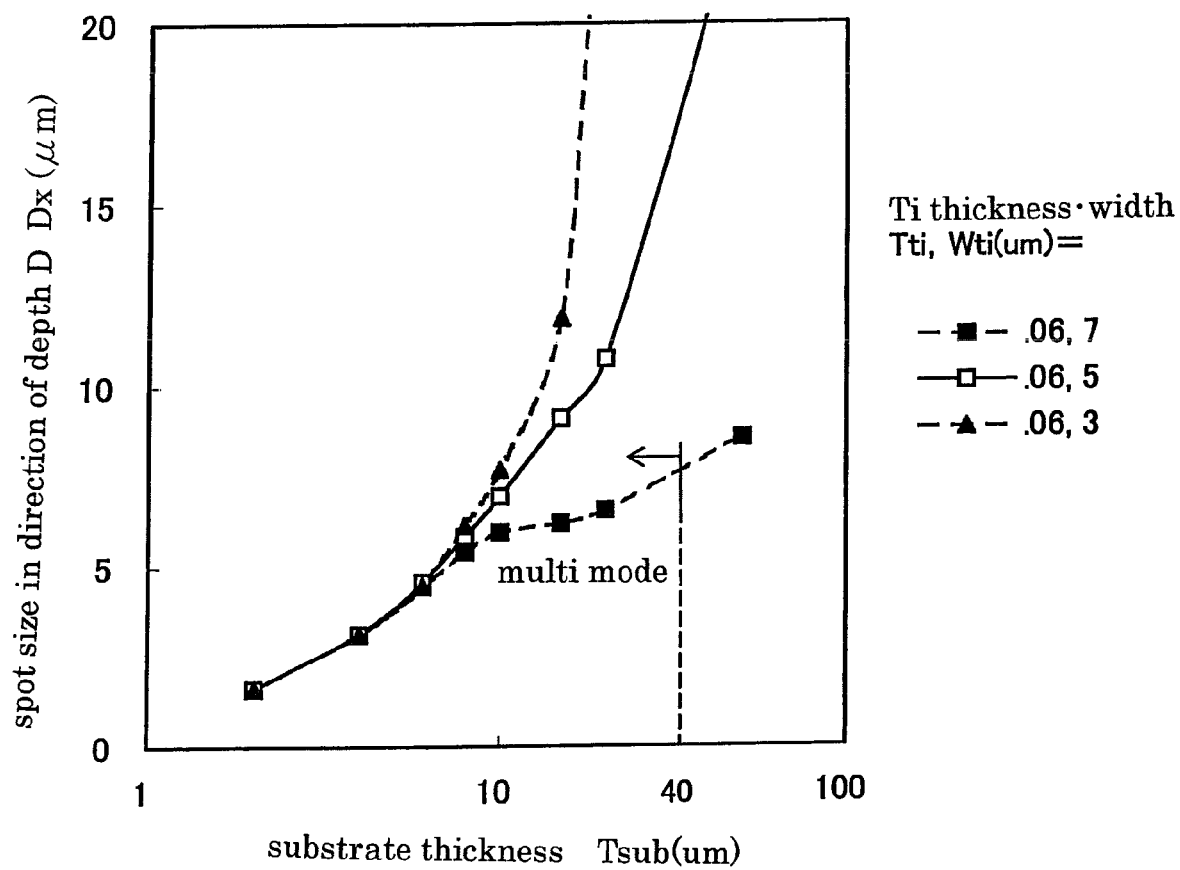
FIG. 15 is a graph showing the relationship of the width and thickness of a titanium layer, a substrate thickness Tsub and the optical spot size in the direction of depth.

The optical modulating device shown in FIG. 2 (a) was produced under the conditions shown in each example of FIG. 14, by the same procedure as the experiment 1. However, the thickness Tti and width Wti of the titanium layer for the titanium diffusion were changed as shown in FIG. 14. FIG. 14 shows the relationship between the optical spot size in the direction "D" of depth and the substrate thickness Tsub. FIG. 15 shows the relationship between the optical spot size in the direction "D" of depth and substrate thickness Tsub.

In the case that Tti is 0.06 μm and Wti is 3 μm (Dyo is about 500 μm (cut-off state)). Cut-off state is provided at Tsub of 50 μm or more, so that it does not substantially function as a device. At Tsub of 40 μm or smaller, Neff is 2.137 or lower, single mode is realized in the direction "W" of width and multi mode is realized at Tsub of 500 μm or smaller in the direction "D" of depth. According to the case that Tti is 0.06 μm and Wti is 6 μm (Neff is 2.1373 and Dyo is 25 μm at Tsub of 500 μm), single mode is provided in the direction "W" of width, Neff is 2.137 or lower to multi mode at Tsub of 100 μm or smaller in the direction "D" of depth so that the optical spot size is considerably lowered. In the case that Tti is 0.06 μm and Wti is 7 μm (Neff is 2.138 and Dyo is 9 μm when Tsub is 500 μm), Neff becomes 2.138 or lower to multi mode at Tsub of 12 μm or smaller in the direction "W" of width and multi mode is obtained at Tsub of 40 μm or smaller in the direction "D" of depth.

(Experiment 6)

Figure 16:
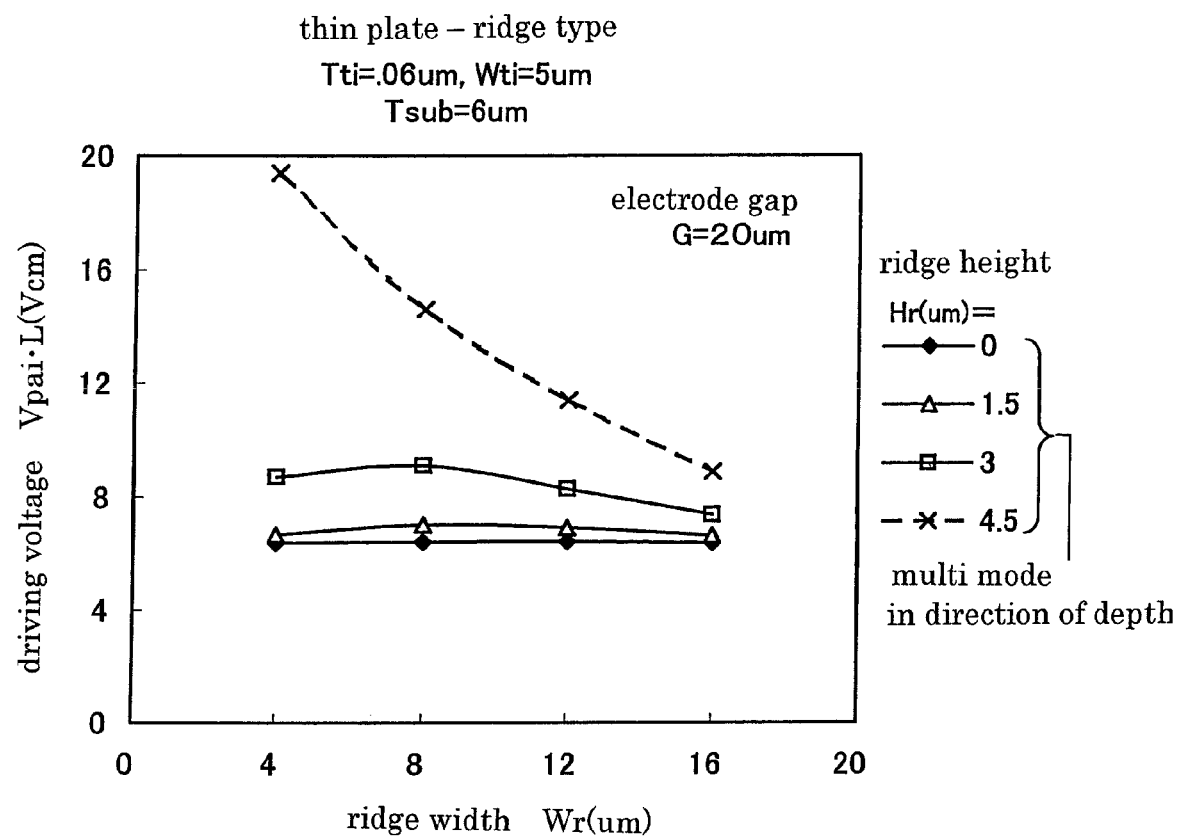
FIG. 16 is a graph showing the relationship of the height and the width of a ridge portion and a driving voltage.

The optical modulating device of FIG. 3 was produced under the conditions of each example shown in FIG. 16, by the same procedure as the experiment 1. However, the thickness Tti and width Wti of the titanium layer for the titanium diffusion were made 0.06 µm and 5 µm, respectively, the thickness Tsub of the ferroelectric thin layer 10 was made 6 µm and the electrode gap "G" was made 20 µm (G/Tsub=10/3). The ridge portion 11 was formed by mechanical processing and laser ablation. FIG. 16 shows the relationship between the ridge width "Wr" and driving voltage Vπ·L. It was further confirmed that the devices shown in the figure were multi mode in the direction "D" of depth.

As can be seen from FIG. 16, the effect of reducing the driving voltage was observed by applying the ridge structure, and as the ridge height Hr is larger, the driving voltage tends to become larger.

(Experiment 7)

Figure 17:
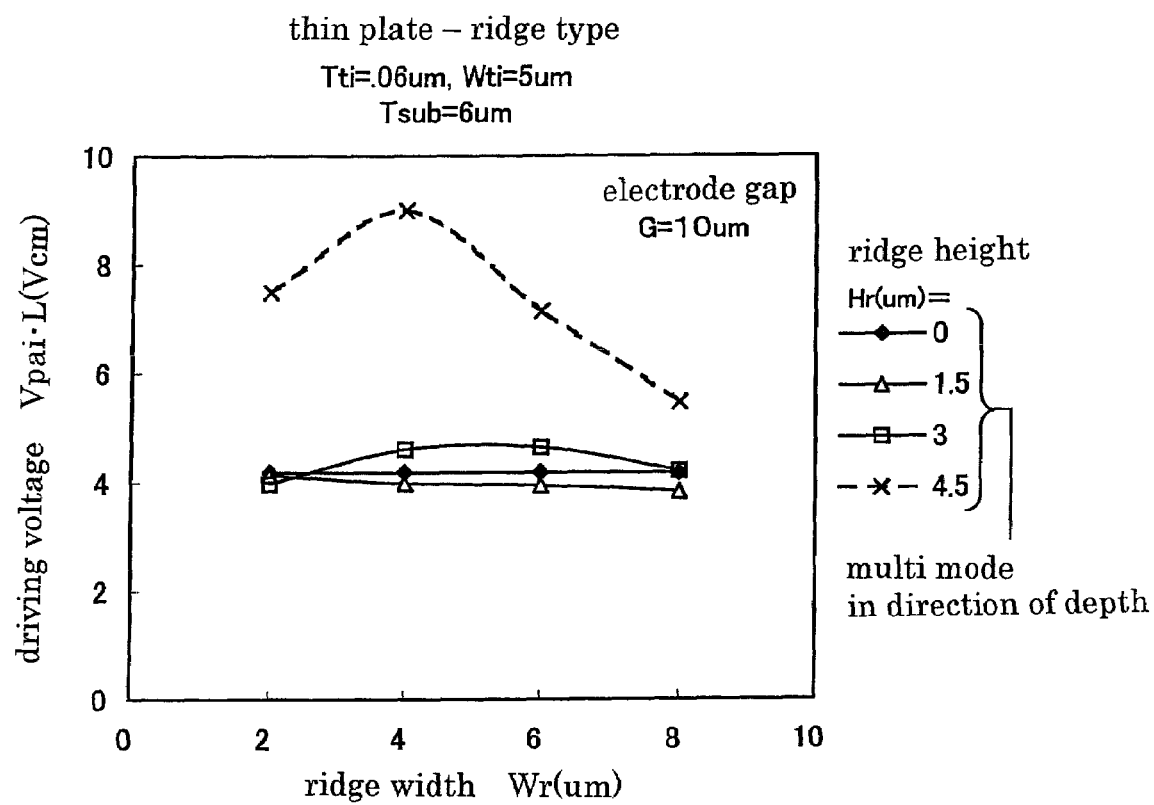
FIG. 17 is a graph showing the relationship of the height and the width of a ridge portion and a driving voltage.

The optical modulating device of FIG. 3 was produced under the conditions shown in FIG. 17, by the same procedure as the experiment 6. The thickness Tti and width Wti of the titanium layer for the titanium diffusion were made 0.06 µm and 5 µm, respectively, the thickness Tsub of the ferroelectric thin layer 10 was made 6 µm and the electrode gap "G" was made 10 µm (G/Tsub=5/3). FIG. 17 shows the relationship between the ridge width Wr and driving voltage Vπ·L. The devices shown in the figure was of multi mode in the direction "D" of depth.

As can be seen from FIG. 17, the driving voltage tends to be lowered at a ridge height Hr of 4.5 µm or lower, and is minimized at Hr of 1.5 µm.

(Experiment 8)

Figure 18:
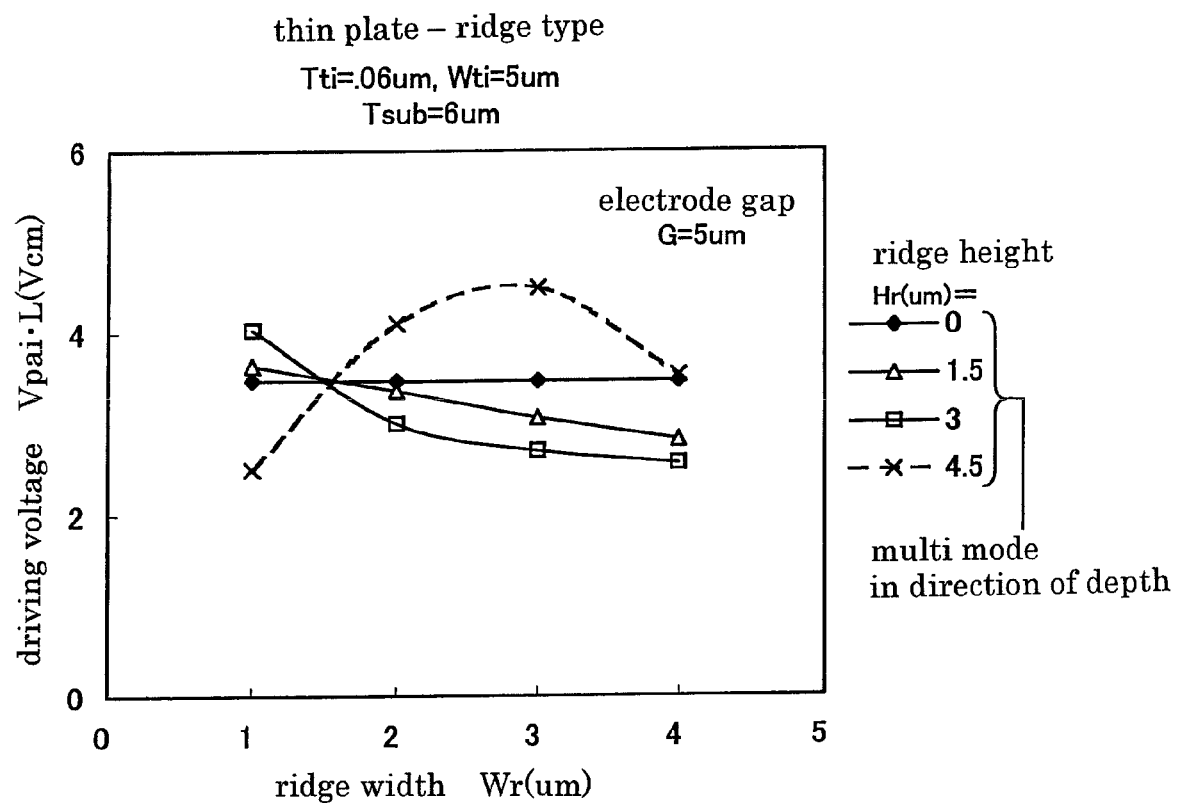
FIG. 18 is a graph showing the relationship of the height and the width of a ridge portion and a driving voltage.

The optical modulating device of FIG. 3 was produced under the conditions shown in FIG. 18, by the same procedure as the experiment 6. The thickness Tti and width Wti of the titanium layer for the titanium diffusion were made 0.06 µm and 5 µm, respectively, the thickness Tsub of the ferroelectric thin layer 10 was made 6 µm and the electrode gap "G" was made 5 µm (G/Tsub=5/6). FIG. 18 shows the relationship between the ridge width Wr and driving voltage Vπ·L. The devices shown in the figure was of multi mode in the direction "D" of depth.

As can be seen from FIG. 18, the driving voltage is considerably lowered at a ridge height Hr of 4.5 µm or lower, compared with the case the electrode gap "G" is 20, 10 µm (FIGS. 16 and 17). It is observed that the driving voltage is minimized at Hr of 4.5 or 3 µm.

(Experiment 9)

Figure 19:
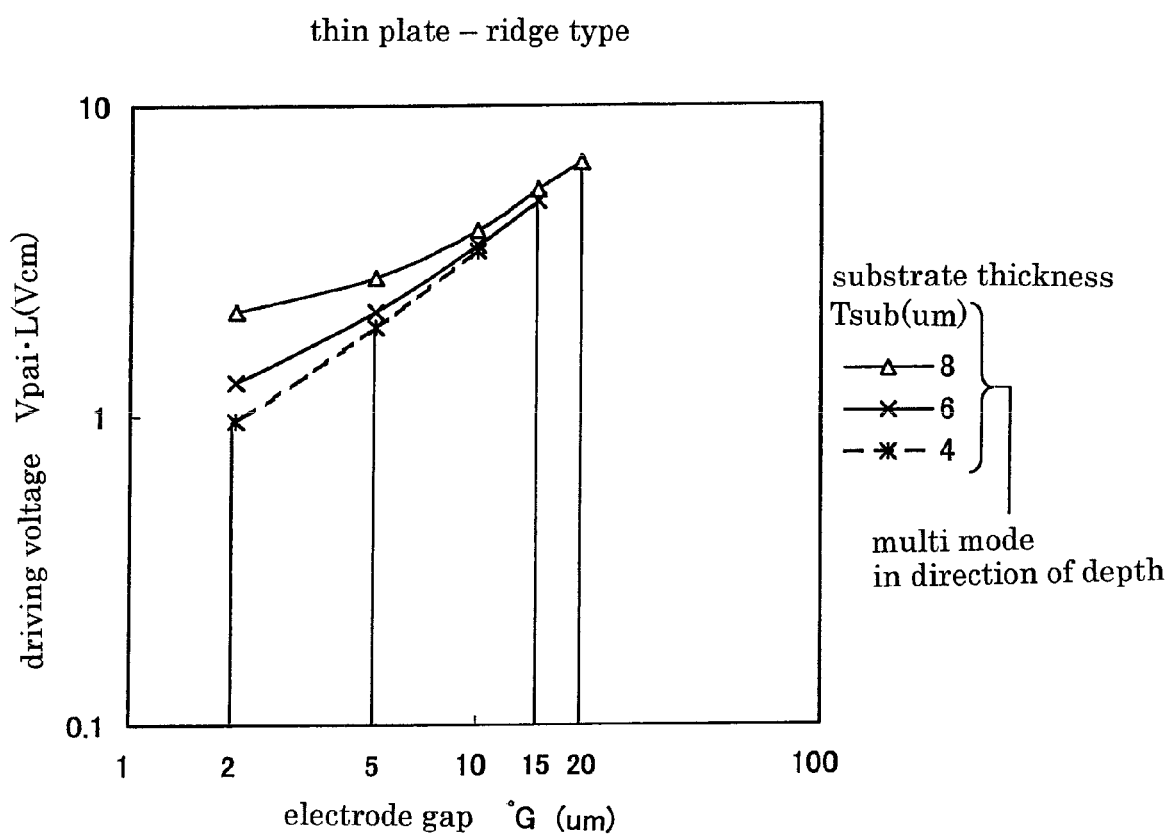
FIG. 19 is a graph showing the relationship of a substrate thickness Tsub, a gap "G" of electrodes and a driving voltage.

The optical modulating device of FIG. 3 was produced under the conditions shown in examples of FIG. 19, by the same procedure as the experiment 6. However, the thickness Tti and width Wti of the titanium layer for the titanium diffusion were made 0.06 µm and 5 µm, respectively, the ridge width Wr was made 8, 6, 4 or 1.6 µm, the ridge height Hr was made 1, 2, 3, 3.5, 4.5 or 6 µm, and the thickness Tsub of the ferroelectric thin layer 19 and electrode gap "G" were changed. FIG. 19 shows the relationship between the electrode gap "G" and driving voltage Vπ·L. In this case, it is confirmed that the devices shown in the figure were of multi mode in the direction "D" of depth.

As can be seen from FIG. 19, the driving voltage is decreased in proportion with "G" and considerably lowered, provided that it is applied the ridge structure where the substrate thickness Tsub is 6 µm or smaller, Hr/Tsub≦3/4 and G/Tsub≦2. This tendency was particularly considerable in a region where the electrode gap "G" is 10 µm or smaller.

The invention claimed is:

1. An optical functional device comprising:
   a dielectric substrate;
   a ferroelectric thin layer provided on said dielectric substrate, said ferroelectric thin layer comprising a material having electro-optical effect and a ridge portion formed therein; and
   an electrode provided on said ferroelectric thin layer,
   wherein a part of said ridge portion functions as a core of an optical waveguide and said dielectric substrate functions as a clad for said optical waveguide,
   wherein said optical waveguide constitutes a multi-mode waveguide in the direction of depth and constitutes a single-mode or multi-mode waveguide in the horizontal direction of said ferroelectric thin layer, and
   wherein the following relationship is satisfied, provided that Hr is assigned to a height of said ridge portion and Tsub is assigned to a thickness of said ferroelectric thin layer:
   Hr/Tsub≦3/4.

2. The device of claim 1, wherein said optical waveguide is formed by the diffusion of an impurity.

3. The device of claim 1, wherein the following relationship is satisfied, provided that G is assigned to a gap of said electrode and Tsub is assigned to a thickness of said ferroelectric thin layer:
   G/Tsub≦2.

4. The device of claim 1, wherein said ferroelectric thin layer has a thickness of 40 µm or smaller.

5. The device of claim 1, wherein said electrode has a gap "G" of 30 µm or smaller.

6. The device of claim 1, wherein said optical waveguide satisfies single mode condition in the direction of width of said ferroelectric thin layer.

7. The device of claim 1, further comprising an adhesive layer provided between said dielectric substrate and said ferroelectric thin layer.

8. The device of claim 1, wherein said dielectric substrate has the minimum value of a thermal expansion coefficient of 1/5 times or more of the minimum value of a thermal expansion coefficient of said ferroelectric thin layer, and wherein said dielectric substrate has the maximum value of a thermal expansion coefficient of 5 times or less of the maximum value of a thermal expansion coefficient of said ferroelectric thin layer.

9. The device of claim 8, wherein said dielectric substrate and said ferroelectric thin layer comprise the same material.

10. An optical functional device comprising:
    a dielectric substrate;
    a ferroelectric thin layer provided on said dielectric substrate and comprising a material having electro-optical effect; and
    an electrode provided on said ferroelectric thin layer,
    wherein a part of said ferroelectric thin layer functions as a core of an optical waveguide and said dielectric substrate functions as a clad for said optical waveguide,
    wherein said optical waveguide constitutes a multi-mode waveguide in the direction of depth and constitutes a single-mode or multi-mode waveguide in the horizontal direction of said ferroelectric thin layer, and
    wherein the following relationship is satisfied, provided that (i) Tsub is assigned to a thickness of said ferroelectric thin layer, (ii) said dielectric substrate and said ferroelectric thin layer comprises the same material, and (iii) Dyo is assigned to a diameter of light spot propagating in said optical waveguide provided that said optical waveguide would be produced in a ferroelectric substrate having a thickness of 500 μm:
Tsub/Dyo≦5.

11. The device of claim 10, wherein said optical waveguide is formed by the diffusion of an impurity.

12. The device of claim 10, wherein said ferroelectric thin layer comprises a ridge portion formed therein, and wherein a part of said ridge portion functions as said core of said optical waveguide.

13. The device of claim 10, wherein the following relationship is satisfied, provided that G is assigned to a gap of said electrode and Tsub is assigned to a thickness of said ferroelectric thin layer:
G/Tsub≦2.

14. The device of claim 10, wherein said ferroelectric thin layer has a thickness of 40 μm or smaller.

15. The device of claim 10, wherein said electrode has a gap "G" of 30 μm or smaller.

16. The device of claim 10, wherein said optical waveguide satisfies single mode condition in the direction of width of said ferroelectric thin layer.

17. The device of claim 10, further comprising an adhesive layer provided between said dielectric substrate and said ferroelectric thin layer.

18. The device of claim 10, wherein said dielectric substrate has the minimum value of a thermal expansion coefficient of ⅕ times or more of the minimum value of a thermal expansion coefficient of said ferroelectric thin layer, and wherein said dielectric substrate has the maximum value of a thermal expansion coefficient of 5 times or less of the maximum value of a thermal expansion coefficient of said ferroelectric thin layer.

* * * * *